United States Patent
Park et al.

(10) Patent No.: US 7,995,689 B2
(45) Date of Patent: Aug. 9, 2011

(54) TRANSMISSION/RECEPTION APPARATUS AND METHOD FOR FREQUENCY DOMAIN SIGNAL PROCESSING IN A SMART ANTENNA SYSTEM

(75) Inventors: Jong Hyeon Park, San Jose, CA (US); Je Woo Kim, San Jose, CA (US); Ju Won Park, San Ramon, CA (US)

(73) Assignee: Qualcomm Incorporated, San Diego, CA (US)

( * ) Notice: Subject to any disclaimer, the term of this patent is extended or adjusted under 35 U.S.C. 154(b) by 1454 days.

(21) Appl. No.: 11/454,726

(22) Filed: Jun. 16, 2006

(65) Prior Publication Data

US 2007/0217526 A1  Sep. 20, 2007

(51) Int. Cl.
*H04B 7/10* (2006.01)
*H04L 1/02* (2006.01)

(52) U.S. Cl. .......... 375/347; 375/349; 370/206

(58) Field of Classification Search .......... 375/316, 375/346, 349, 340, 224, 347; 370/206, 210
See application file for complete search history.

(56) References Cited

U.S. PATENT DOCUMENTS

| | | | | |
|---|---|---|---|---|
| 6,058,121 A | * | 5/2000 | Kim et al. | 370/480 |
| 6,798,738 B1 | * | 9/2004 | Do et al. | 370/210 |
| 7,023,938 B1 | * | 4/2006 | Kapoor et al. | 375/350 |
| 7,139,338 B2 | * | 11/2006 | Wilson et al. | 375/343 |
| 7,643,566 B2 | * | 1/2010 | Hwang et al. | 375/260 |
| 2006/0176802 A1 | * | 8/2006 | Ko et al. | 370/208 |

* cited by examiner

*Primary Examiner* — Jean B Corrielus
*(74) Attorney, Agent, or Firm* — Milan I. Patel

(57) ABSTRACT

An apparatus and a method can improve the performance of a smart antenna system for signal processing in the frequency domain. The method includes: performing Fast Fourier Transform (FFT) on a plurality of incoming signals received through antennas according to a predetermined FFT window; detecting a boundary of an OFDM symbol and setting the FFT window with a margin as large as a predetermined FFT window offset with reference to the detected symbol boundary; receiving the FFT window offset and generating an FFT window calibration signal; and multiplying the FFT-processed incoming signals by the FFT window calibration signal. The method can improve the reception performance of a base station by compensating for the multi-path channel by using an RX FEQ coefficient obtained by a receiver of a terminal as an FEQ weight of a transmitter of the terminal. Further, the method can generate a uniform non-directional beam by generating a variable omni-directional beam pattern in a smart antenna system.

32 Claims, 28 Drawing Sheets

TRANSMISSION/RECEPTION APPARATUS AND METHOD FOR FREQUENCY DOMAIN SIGNAL PROCESSING IN A SMART ANTENNA SYSTEM

PRIORITY

This application claims the benefit under 35 U.S.C. §119(a) of a Republic of Korea application entitled "Smart Antenna System For Frequency Domain Signal Processing, And Method And Apparatus For Signal Transmission/Reception By A Mobile Terminal And A Base Station For The Same" filed in the Korean Industrial Property Office on Mar. 14, 2006 and assigned Serial No. 2006-23742, the contents of which are hereby incorporated by reference.

BACKGROUND OF THE INVENTION

1. Field of the Invention

The present invention relates to a wireless communication system using array antennas, and more particularly to an apparatus and a method for transmitting and receiving packet data of an access terminal and a mobile terminal, which can improve the performance of a smart antenna system for processing signals in a frequency domain.

2. Description of the Related Art

According to rapid development in the communication technology, current wireless communication systems can provide not only typical voice communication services but also a packet data service capable of transmitting high capacity digital data. Mobile communication systems, which are currently being provided or researched in relation to the packet data service, include International Standard (IS)-2000 systems, Evolution Data Only (EV-DO) systems capable of supporting high speed packet data transmission, and Evolution of Data and Voice (EV-DV) systems capable of simultaneously supporting the voice transmission and the high speed packet data transmission, which are synchronous systems, and Universal Mobile Telecommunication Systems (UMTS), which are asynchronous systems.

The packet data services provided to mobile terminals can be briefly classified into services using $3^{rd}$ generation mobile communication networks, such as CDMA 2000 1x, and services using wireless Local Area Network (LAN). The wireless LAN has a wide transmission bandwidth, which enables transmission and reception of packet data within short time. The wireless LAN provides a wireless broadband Internet service, all subscribers of which can share channels and efficiently use wireless channels.

In relation to the wireless LAN, the Institute of Electrical and Electronics Engineers (IEEE) 802.16 standardization group has established the IEEE 802.16d standard for providing wireless broadband Internet service through a stationary terminal, which is a combination of the IEEE 802.16a and 802.16b standards, and is currently preparing the IEEE 802.16e standard for providing portable Internet service to a mobile terminal, which is an improvement of the IEEE 802.16d standard.

By the IEEE 802.16e based wireless broadband Internet service, it is possible to access the wireless Internet anytime and anywhere by a mobile terminal regardless of whether the mobile terminal is stopped or moving. A representative example of the wireless broadband Internet service is the service called "Wibro," research of which is being rapidly progressed. Moreover, various communication schemes including Wi-Fi, Wi-Max, etc. are being researched for the wireless broadband Internet service. In the following description, each network which provides a wireless Internet service according to the IEEE 802.1x standard will be generally referred to as the "wireless LAN."

In the environment in which attention to and demands for the wireless Internet is explosively increasing, an adaptive array antenna, which is also called an intelligent antenna or a smart antenna (hereinafter, referred to simply as "smart antenna"), is being researched as a solution for remarkably improving the quality and transmission speed of the wireless communication. The smart antenna system is a communication system in which a plurality of antenna elements are arranged in a particular pattern, so as to control the direction and beam width of the beams radiated from the antenna elements, thereby forming a directional beam toward a desired mobile terminal for data transmission and reception.

According to the basic principle of the smart antenna system, a transmission/reception beam is formed so that signals intended to be received are subjected to constructive interference and interference signals unintended to be received are subjected to destructive interference. By the smart antenna technology as described above, it is possible to regulate the interference signals at the receiver side and obtain the diversity gain and beam-forming gain, thereby remarkably improving the performance of the system.

The smart antenna technology has the following advantages. First, the transmission signals are not scattered but are collected at a desired location, so that the smart antenna technology can increase the signal gain. Therefore, it is possible to increase the area to be covered by each base station. Further, due to the increase in the signal gain, it is possible to reduce the power consumption of each terminal, which increases the battery use time. Second, signals in undesired directions are efficiently eliminated in the receiver. Therefore, the smart antenna technology can eliminate inference signals. Third, the smart antenna provides a spatial filtering effect, which can greatly reduce the influence of the multipath.

The smart antenna system as described above can be applied not only to the 3G wireless mobile network or wireless LAN, but also to communication networks which use multi-wave transmission schemes, such as the Orthogonal Frequency Division Multiplexing (OFDM) scheme. The OFDM scheme is a representative multiple carrier transmission scheme, in which data are transmitted by a plurality of overlapping sub-carriers orthogonal to each other. According to the OFDM scheme, a serial input symbol sequence is converted into parallel signals, and the parallel signals or data are modulated with a plurality of mutually orthogonal sub-carriers and are then transmitted.

Hereinafter, a conventional smart antenna system will be described for an example of a wireless LAN system in which an Access Point (AP; hereinafter, referred to as "base station") uses the smart antenna technology and a Mobile Terminal (MT) uses a single antenna. If a base station employing the smart antenna technology is completely compatible with a standard wireless LAN, it is possible to remarkably improve the performance of the wireless LAN system by replacing the conventional base station using a single antenna with a base station using a smart antenna, even when the existing mobile terminal is used as it is.

The base station using the smart antenna can transmit data with an omni-directional beam pattern by using a non-directional omni antenna according to a communication protocol. Usually, a fixed omni-directional beam pattern is used in order to transmit data with the omni-directional beam pattern. However, even when a fixed omni-directional beam pattern is actually generated by using a smart antenna, it is difficult to generate a beam pattern which is uniformly distributed over all directions, i.e. in 360 degrees. Therefore, when the conventional fixed omni-directional beam pattern is used, a user's mobile terminal located in a particular direction may experience trouble in communication. For example, FIG. 18 is a waveform graph of an omni-directional beam pattern generated by using a smart antenna implemented by four antenna elements.

Referring to FIG. 18, it is noted that, although an omni-directional beam pattern is generated, the generated omni-directional beam pattern is not evenly distributed in all directions of 360 degrees, because a cell of a base station includes places in which strong beams are formed and places in which weak beams are formed. Therefore, a problem may occur when communicating with a subscriber located in the direction of weak beam pattern.

FIG. 16 is a block diagram showing the structure of a transmitter in a downlink of a conventional smart antenna system.

Transmission (TX) data to be transmitted form a base station to a mobile terminal are mapped according to a predetermined mapping scheme by a mapper 1601, and are then multiplied by transmission weights, which are outputs of the multiplexer 1603, in multipliers 1605a~1605d, respectively. For the transmission weights, TX beam forming weights are used when the communication protocol performs transmission beam formation using a smart antenna, and fixed TX omni weights are used when the communication protocol uses an omni-directional beam pattern using the omni antenna. The TX beam forming weights are preset to have predetermined weight values which enable a beam pattern formed by, for example, four antenna elements, to be most similar to the beam pattern of a typical omni antenna.

The transmission signals which have been multiplied by the transmission weights (TX beam forming weights or fixed TX omni weights) in the multipliers 1605a~1605d are multiplied again in other multipliers 1609a~1609d by calibration weights output from the multiplexer 1607 in order to compensate for the transfer function characteristic of the receiver side or transmission side of the system. For the calibration weights, predetermined TX beam forming calibration weights are used when the transmission weights are TX beam forming weights, and predetermined TX omni calibration weights are used when the transmission weights are fixed TX omni weights. The TX beam forming weights are obtained by using Reception (RX) beam forming weights. Because the RX beam forming weight includes an R element, which is a transfer function characteristic of the receiver side, the TX beam forming weight also includes the R element, which is a transfer function characteristic of the receiver side.

Therefore, in order to transmit data by using the TX beam forming weight, it is preferable to perform weight calibration in consideration of not only the T element, which is a transfer function characteristic of the transmission side, but also the R element, which is a transfer function characteristic of the receiver side. In conclusion, when the TX beam forming weight is used as the transmission weight, the TX beam forming calibration weight of R*/T must be used as the calibration weight, wherein * denotes complex conjugate. In contrast, when the fixed TX omni weight is used as the transmission weight, the calibration weight has a value having no relation to the transfer function characteristic of the receiver side and it is enough to compensate for only the transfer function characteristic of the transmission side.

The transmission signal which have been multiplied by the calibration weights in consideration of the transfer function characteristic of the system in the multipliers 1609a~1609d are sequentially processed by Inverse Fast Fourier Transform (IFFT) units 1611a~1611d for converting the frequency domain signals to time domain signals, Guard Interval (GI) inserters for inserting GIs to the OFDM data in order to prevent data loss due to inter-symbol interference, and TX RF units for RF processing 1615a~1615d, and are then transmitted to a wireless network through antennas 1617a~1617d.

Hereinafter, a receiver of a mobile terminal for receiving the transmission signals of the base station in a downlink will be described.

FIG. 1 is a block diagram illustrating a structure of a receiver of a mobile terminal in a downlink of a conventional smart antenna system. It is assumed that a transmitter of the base station not shown in FIG. 1 performs, for example, signal processing in the frequency domain, and transmits data according to the OFDM transmission scheme by using multiple antenna elements.

A transmission signal of the base station, which has reached an antenna 101 of a receiver 100 of a mobile terminal after passing through a radio channel, is input to RX RF unit 103, is subjected to signal processing such as frequency down-conversion, and is then converted to a digital signal. From the digital signal obtained after the RX RF unit 103, a frequency offset is eliminated by a sub-carrier Frequency Offset estimation and compensation Unit (hereinafter, referred to as "FO") 105.

The signal output from the FO 105 is input to a Fast Fourier Transform (FFT) unit 107 for converting a time domain signal to a frequency domain signal and an FFT window detector 109 for determining window setup of the FFT unit 107. For the window setup of the FFT unit 107, a reference point of a window and a window offset must be set in advance. To this end, the FFT window detector 109 detects an exact OFDM symbol boundary from the output of FO 105, and sets an FFT window with a margin as large as the FFT window offset with reference to the detected symbol boundary. Then the FFT unit 107 performs FFT according to the FFT window set by the FFT window detector 109.

The frequency domain incoming signal output from the FFT unit 107 is input to a frequency domain equalizer (FEQ) 111 for elimination of interference signals. A value estimated by the FEQ estimator 113 is used as the FEQ coefficient for the operation of FEQ 111. Further, the FEQ estimator 113 receives the signal output from the FFT unit 107 and a predetermined reference signal for estimation of an FEQ coefficient, estimates the FEQ coefficient by using the incoming signals, and then transfers the estimated FEQ coefficient to the FEQ 111. The reference signal may be, for example, a long preamble signal, which is a reference training pattern signal defined in the wireless LAN standard IEEE Std 802.11a-1999.

The output signal of the FEQ 111 passes through a Timing Offset estimator and compensator (hereinafter, referred to as "TO") 115 for compensation of timing offset and then passes through a Residual Frequency Offset estimator and compensator (hereinafter, referred to as "RFO") 117 for compensation of residual frequency offset. After the residual frequency offset is compensated by the RFO 117, the signal is demodulated by a demapper 119 according to a demodulation scheme corresponding to a predetermined modulation scheme such as Quadrature Phase Shift Keying (QPSK), 16 Quadrature Amplitude Modulation (QAM), etc. and is then output as RX data. Then, channel decoding, etc. are performed in the stages after the demapper 119, so as to restore the original data.

In the receiver using the OFDM transmission scheme as described above, although an FFT window offset of about two to four samples is usually set, it is problematic that the phase of an incoming signal is rotated due to the influence of the FFT window offset, so as to degrade the reception performance. However, the performance degradation due to the phase rotation of the incoming signal becomes more severe when incoming beam formation is performed by a receiver of a base station as shown in FIG. 2.

FIG. 2 is a block diagram illustrating a structure of a receiver of a base station in an uplink of a conventional smart antenna system. The base station shown in FIG. 2 uses a plurality of array antennas. For convenience of description, it is assumed that the base station uses four antennas.

The signal transmitted from a mobile terminal of a subscriber is received by array antennas 201a~201d of a base station receiver 200 through a radio channel. The signal received by the array antennas 201a~201d is input to RX RF units 203a~203d of corresponding RF chains for RF processing such as frequency down-conversion, and is then converted to digital signals. From the signals output from the RX RF units 203a~203d, frequency offsets are eliminated by FOs 205a~205d located in corresponding signal paths, respectively.

The signals output from FOs 205a~205d are transferred to FFT units 207a~207d on respective signal paths and input ports of an FFT window detector 209 for determining the window setup of the FFT units 207a~207d. Meanwhile, in order to set a reference point of a window and a window offset in advance, the FFT window detector 209 detects an exact OFDM symbol boundary from the output of each of the FOs 205a~205d, and sets FFT windows for the FFT units 207a~207d with a margin as large as the FFT window offset with reference to the detected symbol boundary. Then, the FFT units 207a~207d perform FFT according to the FFT windows set by the FFT window detector 209.

The frequency domain incoming signals output from the FFT units 207a~207d and the RX beam forming weights generated by the RX beam forming weight calculator 215 are multiplied in the multipliers 211a~211d, and the products of the multiplications are then added in the adder 213, so as to perform RX beam formation. The RX beam forming weight calculator 215 calculates an optimum RX beam forming weight for each antenna path by using a predetermined reference signal for FEQ coefficient estimation and an incoming signal through each antenna path output from the FFT units 207a~207d. The reference signal may be, for example, a long preamble signal, which is a reference training pattern signal defined in the wireless LAN standard IEEE Std 802.11a-1999.

The incoming signal output from the adder 213 is input to an FEQ 217 and an FEQ estimator 219. The FEQ estimator 219 estimates an FEQ coefficient for the operation of the FEQ 217 by using the reference signal and the incoming signal output from the adder 213. The signal output from the FEQ 217 passes through a TO 221 and an RFO 223, while the signal is compensated for a timing offset and a residual frequency offset. After the compensation by the TO 221 and the RFO 223, the signal is demodulated by a demapper 225 according to a demodulation scheme corresponding to a predetermined modulation scheme such as QPSK, 16 QAM, etc. and is then output as RX data.

The conventional smart antenna systems as shown in FIGS. 1 and 2 have the following problems.

A smart antenna system using an OFDM communication scheme proper for the frequency domain signal processing necessarily requires a process of detecting an exact OFDM symbol, setting an FFT window according to a result of the symbol detection, and performing FFT. However, in a usual OFDM system, in order to improve the performance, FFT is performed by using an FFT offset of about two to four samples, instead of using an FFT window set based on the exact OFDM symbol boundary.

However, after the FFT, the phase of the incoming signal rotates a predetermined angle due to the influence of the FFT window offset. Such a phase rotation may have an effect on the calculation of RX beam forming weight at the receiver side of the smart antenna system, thereby degrading the performance of the system. Further, when a TX beam forming weight is obtained by using the RX beam forming weight, the performance of the TX beam forming weight may also be degraded.

Hereinafter, the influence on the RX beam forming weights by the FFT window offsets will be described with reference to the results of the following experiments.

FIGS. 3A through 3C are waveform graphs for illustrating a reference signal for FEQ coefficient estimation when the FFT window offset is zero, an incoming signal, and a weight signal for RX beam formation in the receiver of FIG. 2, respectively.

FIG. 3A illustrates a reference signal used for FEQ coefficient estimation when the array antennas include four antenna elements and the FFT window offset is 0 sample, and FIG. 3B illustrates an incoming signal corresponding to the reference signal of FIG. 3A. Further, FIG. 3C illustrates an RX beam forming weight signal which is a resultant signal obtained through calculation using the reference signal and the incoming signal. It is noted that no phase rotation occurs in the RX beam forming weight signal as shown in FIG. 3C when the FFT window offset is 0. However, the OFDM system cannot avoid performance degradation when no FFT window offset is given as shown in FIGS. 3A through 3C.

In general, an FFT window offset is given by the following reasons. First, the performance degradation increases when no FFT window offset is given and FFT is performed by putting a point after the exact FFT window start point as the FFT window start point. Therefore, the first reason is to arrange a margin by an FFT window offset based on the exact FFT window start point. Second, it is helpful for performance improvement to also use signals before a strong signal path which is mainly detected at the time of FFT window detection when there exist multi-paths for OFDM symbol reception.

However, even when a proper FFT window offset is set for the performance improvement of the OFDM system, the following problems occur.

FIGS. 4A through 4C are waveform graphs for illustrating a reference signal for FEQ coefficient estimation, an incoming signal, and a weight signal for RX beam formation, respectively, when the FFT window offset is one in the receiver of FIG. 2.

FIG. 4A illustrates a reference signal used for FEQ coefficient estimation when the FFT window offset is 0 sample likewise in FIG. 3A, and FIG. 4B illustrates a waveform of an incoming signal output after being phase-rotated when an FFT window offset of 1 is set to the signal waveform FIG. 3A. Further, FIG. 4C illustrates an RX beam forming weight signal which is a resultant signal obtained through calculation using the reference signal and the incoming signal. It is noted that the phase rotation in proportion to the window offset occurs in the RX beam forming weight signal when the FFT window offset is set as described above. The phase-rotated RX beam forming weight degrades the performance of the smart antenna system. Further, the TX beam forming weight obtained by using the RX beam forming weight is also influenced by the phase rotation, and the performance of the TX beam forming weight is thus also degraded.

As described above, in the case of a conventional smart antenna system, even when a fixed omni-directional beam pattern is actually generated by using the smart antenna, it is difficult to generate a beam pattern uniformly distributed over all directions of 360 degrees, and a mobile terminal located in a particular direction may experience trouble in communication. Further, the phase of the incoming signal after FFT is rotated due to the FFT window offset at the receiver side, so as to degrade the performance of the smart antenna system. Further, although the base station performs RX and TX beam formation by employing the smart antenna for improvement in the transmission and reception performance, a subscriber's mobile terminal which has a single antenna performs passive operation simply depending on the base station.

SUMMARY OF THE INVENTION

Accordingly, the present invention has been made to solve the above-mentioned problems occurring in the prior art, and an object of the present invention is to provide an apparatus and a method for signal reception, which can compensate for phase rotation of an incoming signal due to an FFT window offset in a smart antenna system.

It is another object of the present invention to provide an apparatus and a method for signal reception, which can generate a beam forming weight by compensating for phase rotation of an incoming signal due to an FFT window offset in a smart antenna system.

It is another object of the present invention to provide an apparatus and a method for signal transmission by a mobile terminal in a smart antenna system, in which the mobile terminal transmits data by using an FEQ coefficient estimated by the mobile terminal.

It is another object of the present invention to provide an apparatus and a method for signal transmission by a mobile terminal in a smart antenna system, which can form a uniform non-directional beam by generating a variable omni-directional beam pattern.

In order to accomplish this object, there is provided a signal receiving apparatus of a base station in a smart antenna system which uses an Orthogonal Frequency Division Multiplexing (OFDM) communication scheme, the signal receiving apparatus comprising: a plurality of Fast Fourier Transform (FFT) units for performing FFT according to a predetermined FFT window on a plurality of incoming signals received through a plurality of antennas an FFT window detector for detecting a boundary of an OFDM symbol and setting the FFT window with a margin as large as a predetermined FFT window offset with reference to the detected symbol boundary; a calibration signal generator for outputting an FFT window calibration signal based on the FFT window offset; and a plurality of first multipliers for multiplying each of the incoming signals output from the FFT units by the FFT window calibration signal.

In accordance with another aspect of the present invention, there is provided a signal receiving apparatus of a base station in a smart antenna system which uses an Orthogonal Frequency Division Multiplexing (OFDM) communication scheme, the signal receiving apparatus comprising: a plurality of Fast Fourier Transform (FFT) units for performing FFT according to a predetermined FFT window on a plurality of incoming signals received through a plurality of antennas; an FFT window detector for detecting a boundary of an OFDM symbol and setting the FFT window with a margin as large as a predetermined FFT window offset with reference to the detected OFDM symbol boundary; a calibration signal generator for outputting an FFT window calibration signal based on the FFT window offset; a plurality of first multipliers for multiplying a predetermined reference signal for frequency domain equalizer (FEQ) coefficient estimation by the FFT window calibration signal; and a reception (RX) beam forming weight calculator for calculating an RX beam forming weight for each of antenna paths by using the incoming signals output from the FFT units and signals output from the first multipliers.

In accordance with another aspect of the present invention, there is provided a signal receiving apparatus of a mobile terminal in a smart antenna system which uses an Orthogonal Frequency Division Multiplexing (OFDM) communication scheme, the signal receiving apparatus comprising: a Fast Fourier Transform (FFT) unit for performing FFT according to a predetermined FFT window on an incoming signal received through an antenna; an FFT window detector for detecting a boundary of an OFDM symbol and setting the FFT window with a margin as large as a predetermined FFT window offset with reference to the detected OFDM symbol boundary; a calibration signal generator for outputting an FFT window calibration signal based on the FFT window offset; a first multiplier for multiplying the incoming signal output from the FFT unit by the FFT window calibration signal; and a frequency domain equalizer (FEQ) estimator for estimating FEQ coefficients by using a signal output from the first multiplier and a predetermined reference signal.

In accordance with another aspect of the present invention, there is provided a signal receiving apparatus of a mobile terminal in a smart antenna system which uses an Orthogonal Frequency Division Multiplexing (OFDM) communication scheme, the signal receiving apparatus comprising: a Fast Fourier Transform (FFT) unit for performing FFT according to a predetermined FFT window on incoming signal received through an antenna; an FFT window detector for detecting a boundary of an OFDM symbol and setting the FFT window with a margin as large as a predetermined FFT window offset with reference to the detected OFDM symbol boundary; a calibration signal generator for outputting an FFT window calibration signal based on the FFT window offset; a first multiplier for multiplying a predetermined reference signal for frequency domain equalizer (FEQ) coefficient estimation by the FFT window calibration signal; and a FEQ estimator for estimating FEQ coefficients by using a signal output from the FFT unit and the compensated reference signal transferred from the first multiplier.

A transmitter of the mobile terminal may include a second multiplier for multiplying an input outgoing signal by the FEQ coefficients as weights.

In accordance with another aspect of the present invention, there is provided a signal transmitting apparatus of a base station in a smart antenna system which uses an Orthogonal Frequency Division Multiplexing (OFDM) communication scheme, the signal transmitting apparatus comprising: a mapper for mapping outgoing signals according to a predetermined modulation scheme for transmission to a mobile terminal; a multiplexer for selectively outputting transmission (TX) beam forming weights for forming a directional beam pattern or TX omni weights for forming an omni-directional beam pattern; a plurality of multiplier for multiplying the outgoing signals by weight signals output from the multiplexer; and a controller for outputting the TX omni weights time-variably and generating the omni-directional beam pattern when the omni-directional beam pattern is selected.

In accordance with another aspect of the present invention, there is provided a signal receiving method of a base station in a smart antenna system which uses an Orthogonal Frequency Division Multiplexing (OFDM) communication scheme, the signal receiving method comprising the steps of: performing Fast Fourier Transform (FFT) according to a predetermined FFT window on a plurality of incoming signals received through a plurality of antennas; detecting a boundary of an OFDM symbol and setting the FFT window with a margin as large as a predetermined FFT window offset with reference to the detected OFDM symbol boundary; generating an FFT window calibration signal based on the FFT window offset; and multiplying each of the FFT-processed incoming signals by the FFT window calibration signal.

In accordance with another aspect of the present invention, there is provided a signal receiving method of a base station in a smart antenna system which uses an Orthogonal Frequency Division Multiplexing (OFDM) communication scheme, the signal receiving method comprising: performing Fast Fourier Transform (FFT) according to a predetermined FFT window on a plurality of incoming signals received through a plurality of antennas; detecting a boundary of an OFDM symbol and setting the FFT window with a margin as large as a predetermined FFT window offset with reference to the detected OFDM symbol boundary; generating an FFT window calibration signal based on the FFT window offset; multiplying a predetermined reference signal for frequency domain equalizer (FEQ) coefficient estimation by the FFT window calibration signal; and calculating an RX beam forming weight for each of the antenna paths by using the FFT-processed incoming signals and a signal compensated by the FFT window calibration signal.

In accordance with another aspect of the present invention, there is provided a signal transmission/reception method of a mobile terminal in a smart antenna system which uses an Orthogonal Frequency Division Multiplexing (OFDM) communication scheme, the mobile terminal comprising a transmitter and a receiver, wherein the signal transmission/reception method comprises the steps of: performing, by the receiver, Fast Fourier Transform (FFT) on an incoming signal received through an antenna according to a predetermined FFT window; detecting, by the receiver, a boundary of an OFDM symbol and setting the FFT window with a margin as large as a predetermined FFT window offset with reference to the detected OFDM symbol boundary; generating, by the receiver, an FFT window calibration signal based on the FFT window offset; multiplying, by the receiver, the FFT-processed incoming signal by the FFT window calibration signal; estimating, by the receiver, frequency domain equalizer (FEQ) coefficients by using the incoming signal compensated by the FFT window calibration signal and a predetermined reference signal; and multiplying, by the transmitter, an input outgoing signal by the FEQ coefficients as weights.

In accordance with another aspect of the present invention, there is provided a signal transmission/reception method of a mobile terminal in a smart antenna system which uses an Orthogonal Frequency Division Multiplexing (OFDM) communication scheme, the mobile terminal comprising a transmitter and a receiver, wherein the signal transmission method/reception comprises the steps of: performing, by the receiver, Fast Fourier Transform (FFT) according to a predetermined FFT window on incoming signal received through antenna; detecting, by the receiver, a boundary of an OFDM symbol and setting the FFT window with a margin as large as a predetermined FFT window offset with reference to the detected OFDM symbol boundary; receiving the FFT window offset and generating an FFT window calibration signal based on the FFT window offset; multiplying, by the receiver, a predetermined reference signal for frequency domain equalizer (FEQ) coefficient estimation by the FFT window calibration signal; estimating, by the receiver, frequency domain equalizer (FEQ) coefficients by using the FFT-processed incoming signal and the compensated reference signal; and multiplying, by the transmitter, an input outgoing signal by the FEQ coefficients as weights.

In accordance with another aspect of the present invention, there is provided A signal transmission method of a base station in a smart antenna system which uses an Orthogonal Frequency Division Multiplexing (OFDM) communication scheme, the signal transmission method comprising the steps of: mapping outgoing signals according to a predetermined modulation scheme for transmission to a mobile terminal; selectively outputting transmission (TX) beam forming weights for forming a directional beam pattern or TX omni weights for forming an omni-directional beam pattern; and multiplying the outgoing signals by the TX omni weights time-variably output and generating the omni-directional beam pattern when the omni-directional beam pattern is selected.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

Hereinafter, preferred embodiments of the present invention will be described with reference to the accompanying drawings. In the following description, a detailed description of known functions and configurations incorporated herein will be omitted when it may make the subject matter of the present invention rather unclear.

First, a smart antenna system proposed by the present invention will be briefly described prior to the detailed description of the embodiments. The smart antenna system according to the present invention is based on signal processing in the frequency domain. Further, in the smart antenna system according to the present invention, a base station uses array antennas and exchanges data with a mobile terminal according to an OFDM scheme, and the mobile terminal exchanges data with the base station according to the OFDM scheme by using a single antenna.

The embodiments of the present invention will be discussed hereinafter based on the following three points of view. However, it should be noted that the embodiments described below do not limit the scope of the present invention. The first viewpoint of the present invention, which will be described with reference to FIGS. 5 through 13, proposes a scheme for improving RX/TX beam formation performance by compensating for phase rotation of an incoming signal by an FFT window offset in a smart antenna system. The second viewpoint of the present invention, which will be described with reference to FIGS. 14 and 15, proposes a scheme in which a transmitter of a mobile terminal using a single antenna in a smart antenna system transmits data by using an FEQ coefficient estimated by a receiver of the mobile terminal, so as to compensate for the multi-path channel, thereby improving reception performance of a base station in an uplink. The third viewpoint of the present invention, which will be described with reference to FIGS. 14 and 15, proposes a scheme in which, when a base station in a smart antenna system generates a non-directional beam pattern, it generates a variable omni-directional beam pattern by the smart antenna, which is uniform in all directions of 360 degrees.

Figure 5:
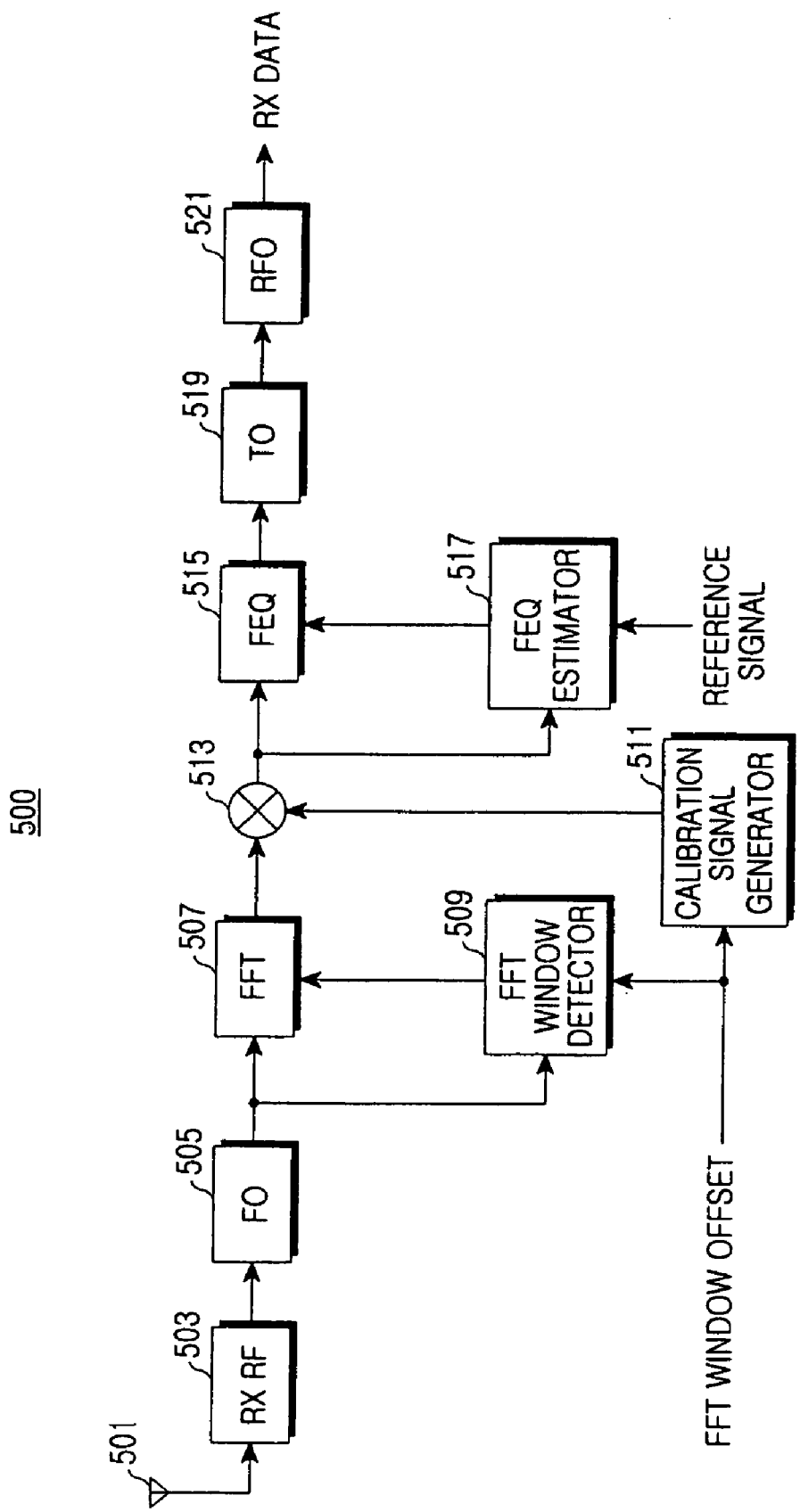
FIG. 5 is a block diagram illustrating a structure of a receiver of a mobile terminal in a smart antenna system according to an embodiment of the present invention.

FIG. 5 is a block diagram illustrating a structure of a receiver 500 of a mobile terminal in a smart antenna system according to an embodiment of the present invention.

The mobile terminal shown in FIG. 5 receives a radio signal according to an OFDM scheme from a base station (not shown) including a plurality of antenna elements. The radio signal is received through a radio channel by a single antenna 501 and is then input to a reception (RX) RF unit 503 in which the signal is subjected to signal processing such as frequency down conversion, etc. and is converted to a digital signal. Then, frequency offset is eliminated from the digital signal in a sub-carrier Frequency Offset estimation and compensation unit (hereinafter, referred to as "FO") 505, and the resultant signal is then input to an FFT unit 507 and an FFT window detection unit 509.

In order to perform FFT on the signal having passed the FO 505, it is necessary to determine the start point of the FFT. To this end, the FFT window detector 509 detects an exact boundary of the received OFDM symbol from the output of FO 505, and sets an FFT window for the FFT unit 507 with a margin as large as a predetermined FFT window offset with reference to the detected boundary. Then, the FFT unit 507 performs FFT according to the FFT window set by the FFT window detector 509.

The frequency domain incoming signal output from the FFT unit 507 is multiplied in a multiplier 513 by a predetermined FFT window calibration signal generated by a calibration signal generator 511, so that the phase rotation due to the FFT window offset is compensated. At this time, the calibration signal generator 511 receives the same value as the FFT window offset set for the FFT unit 507 and generates the FFT window calibration signal. The compensated incoming signal output from the multiplier 513 passes through a frequency domain equalizer (FEQ) 515 for elimination of interference signals.

A value estimated by the FEQ estimator 517 is used as the FEQ coefficient for the operation of FEQ 515. Further, the FEQ estimator 517 receives the compensated incoming signal output from the multiplier 513 and a predetermined reference signal for estimation of an FEQ coefficient, estimates the FEQ coefficient by using the incoming signals, and then transfers the estimated FEQ coefficient to the FEQ 515. The reference signal may be, for example, a long preamble signal, which is a reference training pattern signal defined in the wireless LAN standard IEEE Std 802.11a-1999.

The output signal of the FEQ 515 passes through a Timing Offset estimator and compensator (hereinafter, referred to as "TO") 521 for compensation of timing offset and then passes through a Residual Frequency Offset estimator and compensator (hereinafter, referred to as "RFO") 521 for compensation of residual frequency offset. The compensated incoming signal is demodulated by a demapper (not shown) according to a demodulation scheme corresponding to a predetermined modulation scheme such as Quadrature Phase Shift Keying (QPSK), 16 Quadrature Amplitude Modulation (QAM), etc. and is then output as RX data.

The FEQ coefficient estimated by the FEQ estimator 517 is transferred to the transmitter side of the mobile terminal for use in data transmission. Therefore, the FEQ coefficient is used in the multi-path channel compensation for the transmission signal of the mobile terminal, thereby improving the reception performance of the base station which has received the compensated transmission signal. In this regard, a more detailed description will be given later.

Figure 6:
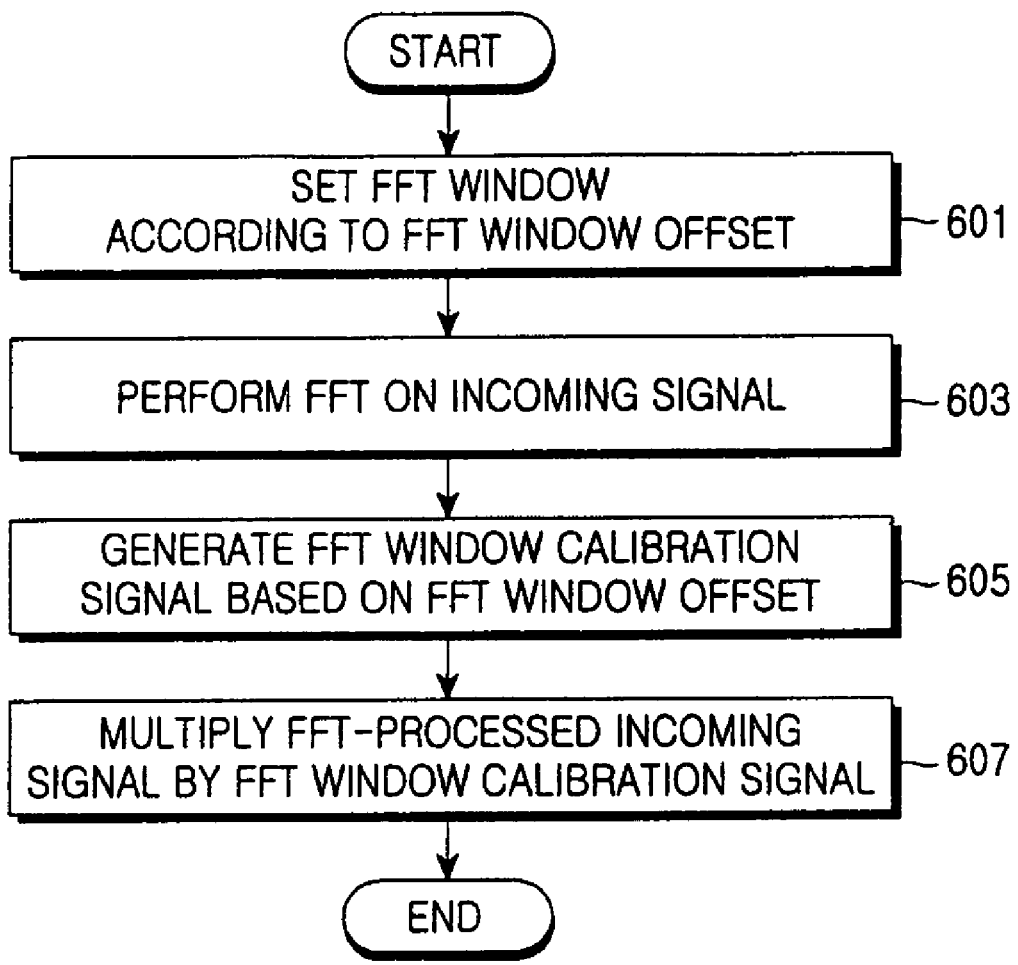
FIG. 6 is a flowchart of a method for compensating for phase rotation of an incoming signal by using an FFT window offset, which is applied to the receiver shown in FIG. 5.

FIG. 6 is a flowchart of a method for compensating for phase rotation of an incoming signal by using an FFT window offset, which is applied to the receiver 500 shown in FIG. 5.

First, in step 601, the FFT window detector 509 sets an FFT window for the FFT unit 507 with a margin as large as a predetermined FFT window offset. In step 603, the FFT unit 507 performs FFT on the incoming signal in accordance with the setup FFT window. In step 605, the calibration signal generator 511 receives the same value as the FFT window offset transferred to the FFT window detector 509 and generates an FFT window calibration signal by using the value. Thereafter, in step 607, the multiplier 513 multiplies the incoming signal output from the FFT unit 507 by the FFT window calibration signal, thereby compensating for the phase rotation of the incoming signal due to the FFT window offset.

The operation of compensating for the phase rotation of the incoming signal as described above is defined by equation (1) below.

$$Rx\_Wo\_foi(k) = Rx\_foi(k) * \exp(j*2*pi*k*Wo/N) \quad (1)$$

In equation (1), k=−N/2, −N/2+1, ..., N/2−1, k denotes a sub-carrier index, N denotes the number of FFT points, Wo denotes the FFT window offset, Rx_foi denotes a frequency offset index of an incoming signal after being subjected to the FFT, exp(j*2*pi*k*Wo/N) denotes the FFT window calibration signal, and Rx_Wo_foi denotes a frequency offset index of an incoming signal after being subjected to FFT window offset compensation.

In the above-described embodiment, the phase rotation of the incoming signal is compensated by multiplying the incoming signal output from the FFT unit 507 by the FFT calibration signal as defined by equation (1). Hereinafter, another embodiment of the phase rotation compensation by the FFT window offset will be described.

Figure 7:
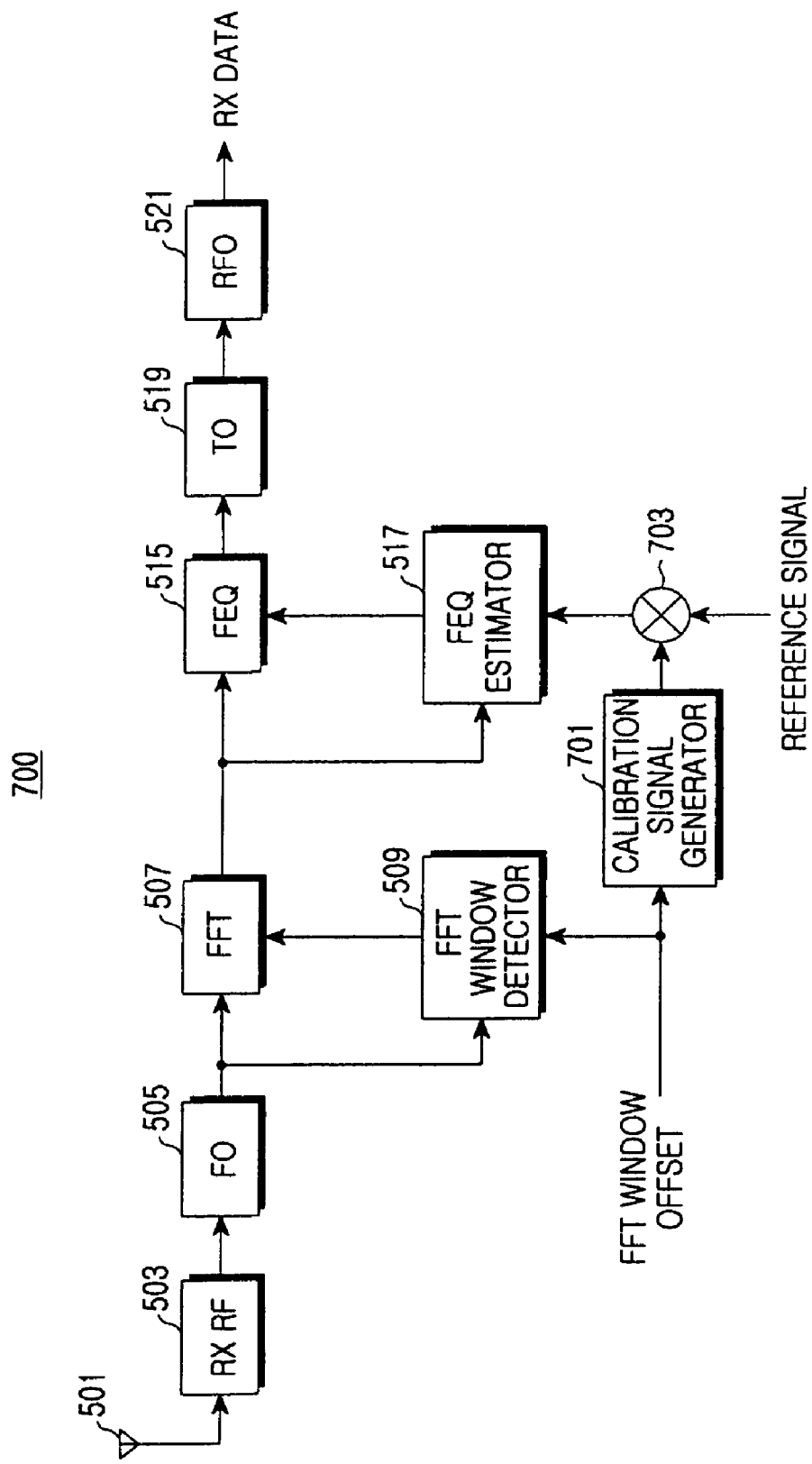
FIG. 7 is a block diagram illustrating a structure of a receiver of a mobile terminal in a smart antenna system according to another embodiment of the present invention.

FIG. 7 is a block diagram illustrating a structure of a receiver 700 of a mobile terminal in a smart antenna system according to another embodiment of the present invention. In relation to FIG. 7, the same elements as those in FIG. 5 will be designated by the same reference numerals and a detailed description thereof will thus be omitted.

Referring to FIG. 7, for the signal input to the FFT unit 507 after the frequency offset is removed from the signal by the FO 505, it is necessary to determine the start point of the FFT. In order to determine the start point of the FFT, the FFT window detector 509 detects an exact boundary of the received OFDM symbol from the output of FO 505, and sets an FFT window for the FFT unit 507 with a margin as large as a predetermined FFT window offset with reference to the detected boundary.

In the present embodiment, the calibration signal generator 701 receives the same value as the FFT window offset transferred to the FFT window detector 509 and generates the FFT window calibration signal. At this time, the calibration signal defined by equation (1) may be used as the FFT window calibration signal. Then, the generated calibration signal is multiplied by a predetermined reference signal for the FEQ coefficient estimation in the multiplier 703 and is then transferred to the FEQ estimator 517. The reference signal may be, for example, a long preamble signal, which is a reference training pattern signal defined in the wireless LAN standard IEEE Std 802.11a-1999.

The FEQ estimator 517 estimates the FEQ coefficient and transfers the FEQ coefficient to the FEQ 515, and the FEQ 515 then eliminates interference signal from the incoming signal output from the FFT unit 507 by using the estimated FEQ coefficient and outputs the interference-eliminated signal. During this process, the incoming signal output from the FEQ 515 is compensated for the phase rotation due to the FFT window offset. The output signal of the FEQ 515 passes through a Timing Offset estimator and compensator (TO) 521 for compensation of timing offset and then passes through a Residual Frequency Offset estimator and compensator (RFO) 521 for compensation of residual frequency offset. The compensated incoming signal is demodulated according to a predetermined demodulation scheme and is then output as RX data.

Figure 8:
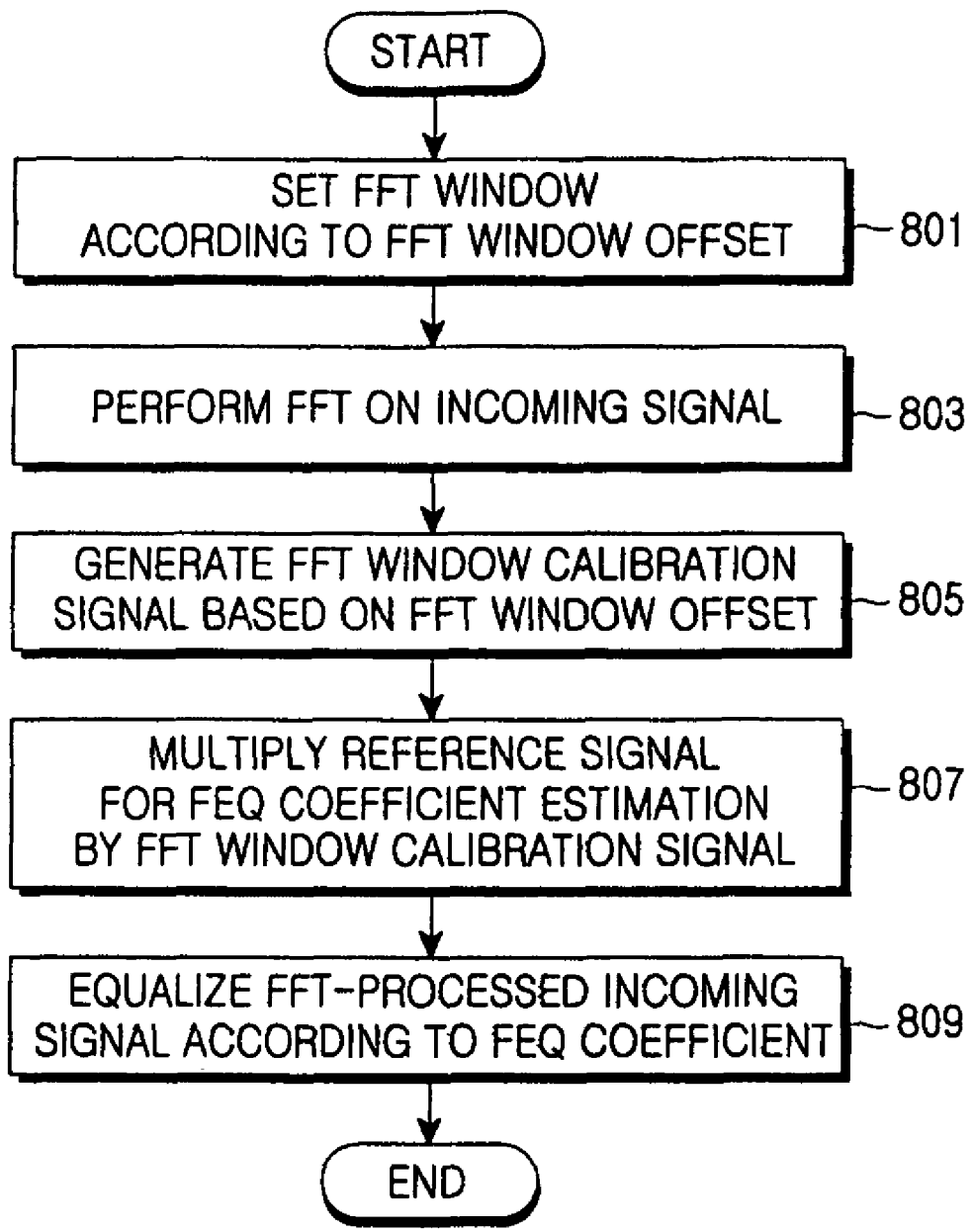
FIG. 8 is a flowchart of a method for compensating for phase rotation of an incoming signal by using an FFT window offset, which is applied to the receiver shown in FIG. 7.

FIG. 8 is a flowchart of a method for compensating for phase rotation of an incoming signal by using an FFT window offset, which is applied to the receiver 700 shown in FIG. 7.

First, in step 801, the FFT window detector 509 sets an FFT window for the FFT unit 507 with a margin as large as a predetermined FFT window offset. In step 803, the FFT unit 507 performs FFT on the incoming signal in accordance with the setup FFT window. In step 805, the calibration signal generator 701 receives the same value as the FFT window offset transferred to the FFT window detector 509 and generates an FFT window calibration signal by using the value. Thereafter, in step 807, the multiplier 703 multiplies a predetermined reference signal for the FEQ coefficient estimation by the FFT window calibration signal generated in step 805 and then transfers the product of the multiplication to the FEQ estimator 517. Finally, in step 809, the FEQ 515 eliminates interference signals from the incoming signal output from the FFT unit 507 by equalizing the incoming signal by using the FEQ coefficient estimated by the FEQ estimator 517.

According to the present embodiment as described above, the FEQ 515 reflects the FFT window calibration signal in the FFQ coefficient estimation. Therefore, through the frequency equalization using the FEQ coefficient, the incoming signal is compensated for the phase rotation due to the FFT window offset, likewise in the previous embodiment as shown in FIGS. 5 and 6.

Hereinafter, embodiments of the present invention applied to a receiver of a base station in a smart antenna system will be described with reference to FIGS. 9 through 12.

Figure 9:
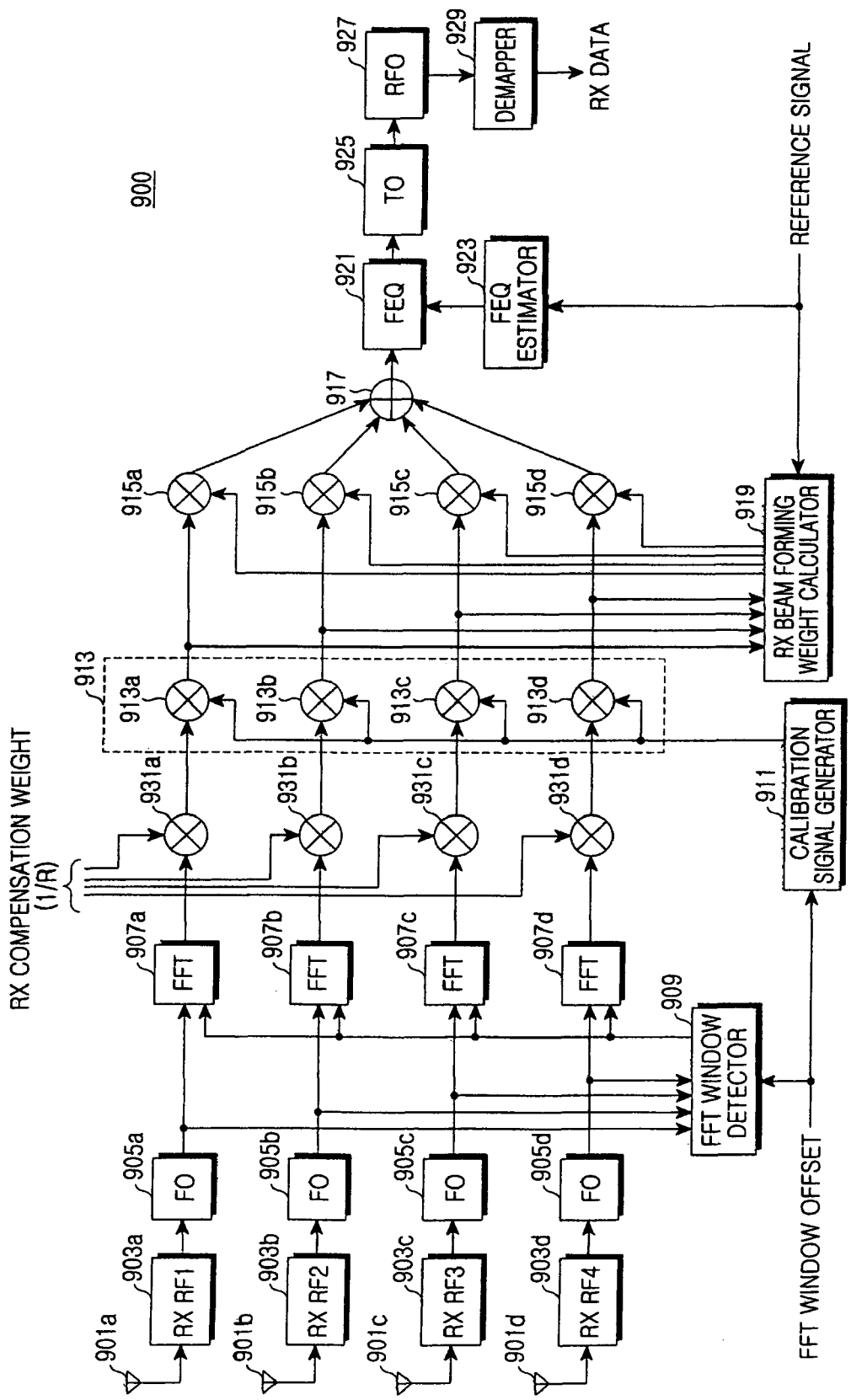
FIG. 9 is a block diagram illustrating a structure of a receiver of a base station in a smart antenna system according to an embodiment of the present invention.

FIG. 9 is a block diagram illustrating a structure of a receiver 900 of a base station in a smart antenna system according to an embodiment of the present invention. The base station shown in FIG. 9 uses a plurality of array antennas. For convenience of description, the following description is based on an assumption that the base station uses four antennas.

The signal transmitted from a mobile terminal of a subscriber is received by array antennas 901a~901d of a base station receiver 900 through a radio channel. The signal received by the array antennas 901a~901d is input to RX RF units 203a~203d of corresponding RF chains for RF processing such as frequency down-conversion, and is then converted to digital signals. From the signals output from the RX RF units 203a~203d, frequency offsets are eliminated by FOs 905a~905d located in corresponding signal paths, respectively.

The incoming signals output from FOs 905a~905d are transferred to FFT units 907a~907d and input ports of an FFT window detector 909 for determining the window setup of the FFT units 907a~907d. For the signals input to the FFT units 907a~907d after the frequency offset is eliminated from them by the FOs 905a~905d, it is necessary to determine the time point for the start of FFT. To this end, the FFT window detector 909 detects an exact OFDM symbol boundary from the outputs of the FOs 905a~905d, and sets FFT windows for the FFT units 907a~907d with a margin as large as a predetermined FFT window offset with reference to the detected symbol boundary. Then, the FFT units 907a~907d perform FFT according to the FFT windows set by the FFT window detector 909.

Meanwhile, when a transfer function characteristic of the receiver side is given as R, the frequency domain incoming signals output from the FFT units 907a~907d are multiplied by the RX beam calibration weights 1/R output from by the RX beam calibration weight generator 935 in the multipliers 931a~931d, so as to compensate for the transfer function characteristic R of the receiver side. In the present invention, the RX beam forming weight does not include the transfer function characteristic R of the receiver side because the RX beam forming weight is obtained from the incoming signal after compensation of the RX calibration weight. Therefore, it is possible to more easily estimate the RX beam forming weight by using the method described above, because the incoming signal does not include the transfer function characteristic R of the receiver side but includes only the transfer function characteristic of the radio channel. The use of the RX calibration weight is optional.

The incoming signals having been compensated for the transfer function characteristic of the receiver side as described above are respectively multiplied by FFT window calibration signals for the incoming signal generated by the calibration signal generator 911 in the multipliers 913a~913d, so as to compensate for the phase rotation of the incoming signals due to the FFT window offset. The calibration signal generator 911 receives the same value as the FFT window offset set for the FFT units 907a~907d and generates FFT window calibration signals by using the value.

The signals obtained by compensating the frequency domain incoming signals output from the FFT units 907a~907d by using the FFT window calibration signals are multiplied by the RX beam forming weights provided by the RX beam forming weight calculator 919 in the multipliers 915a~915d, and the products of the multiplications are then added in the adder 917, so as to form an RX beam. The RX beam forming weight calculator 919 calculates an optimum RX beam forming weight for each antenna by using a predetermined reference signal for FEQ coefficient estimation and an incoming signal through each antenna path compensated by the FFT window calibration signal. The reference signal may be, for example, a long preamble signal, which is a reference training pattern signal defined in the wireless LAN standard IEEE Std 809.11a-1999. A process for obtaining the RX beam forming weight according to the embodiment shown in FIG. 9 will be described later in detail.

The RX beam-formed signal output from the adder 913 is input to an FEQ 921. Further, the FEQ estimator 923 estimates an FEQ coefficient for the operation of the FEQ 921 by using the reference signal. The signal output from the FEQ 921 passes through a TO 925 and an RFO 927, while the signal is compensated for the timing offset and the residual frequency offset. After the compensation by the TO 925 and the RFO 927, the signal is demodulated by a demapper 929 according to a demodulation scheme corresponding to a predetermined modulation scheme such as QPSK, 16 QAM, etc. and is then output as RX data.

Figure 10:
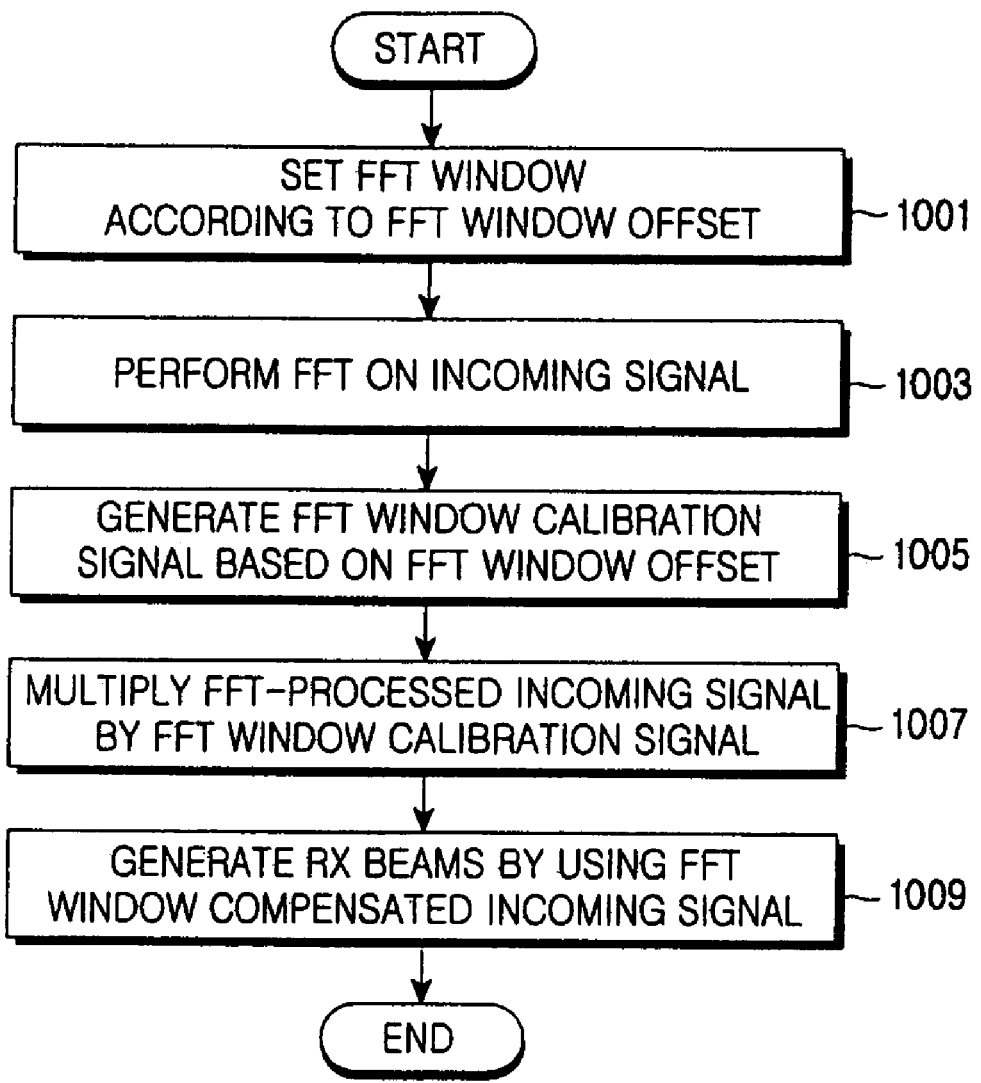
FIG. 10 is a flowchart of a method for compensating for phase rotation of an incoming signal by using an FFT window offset, which is applied to the receiver shown in FIG. 9.

FIG. 10 is a flowchart of a method for compensating for phase rotation of an incoming signal by using an FFT window offset, which is applied to the receiver 900 shown in FIG. 9.

First, in step 1001, the FFT window detector 909 sets FFT windows for the FFT units 907a~907d with a margin as large as a predetermined FFT window offset. In step 1003, the FFT units 907a~907d perform FFT on the incoming signals in accordance with the setup FFT windows. Further, in the case of compensating for the transfer function characteristic R of the receiver side, the incoming signals output from the FFT units 907a~907d are multiplied by a predetermined RX calibration weight 1/R by the multipliers 931a~931d, respectively.

In step 1005, the calibration signal generator 911 receives the same value as the FFT window offset transferred to the FFT window detector 909 and generates FFT window calibration signals by using the value. Thereafter, in step 1007, the multipliers 913a~913d multiply the incoming signals output from the FFT units 907a~907d by the FFT window calibration signals, so as to compensate for the phase rotation of the incoming signals due to the FFT window offset. In step 1009, the RX beam forming weight calculator 919 calculates an RX beam forming weight for each antenna path by using a predetermined reference signal for FEQ coefficient estimation and an incoming signal through each antenna path having been compensated by the FFT window calibration signal. The incoming signals through the antenna paths are multiplied by the RX beam forming weights of the corresponding paths, respectively, and are then added by the adder 917, so as to form the RX beam.

According to the present embodiment, as described above, the phase rotation of the incoming signals is compensated by multiplying the incoming signals output from the FFT units 907a~907d by the FFT window offset calibration signals. Hereinafter, another embodiment for compensation of the FFT window offset will be described.

Figure 11:
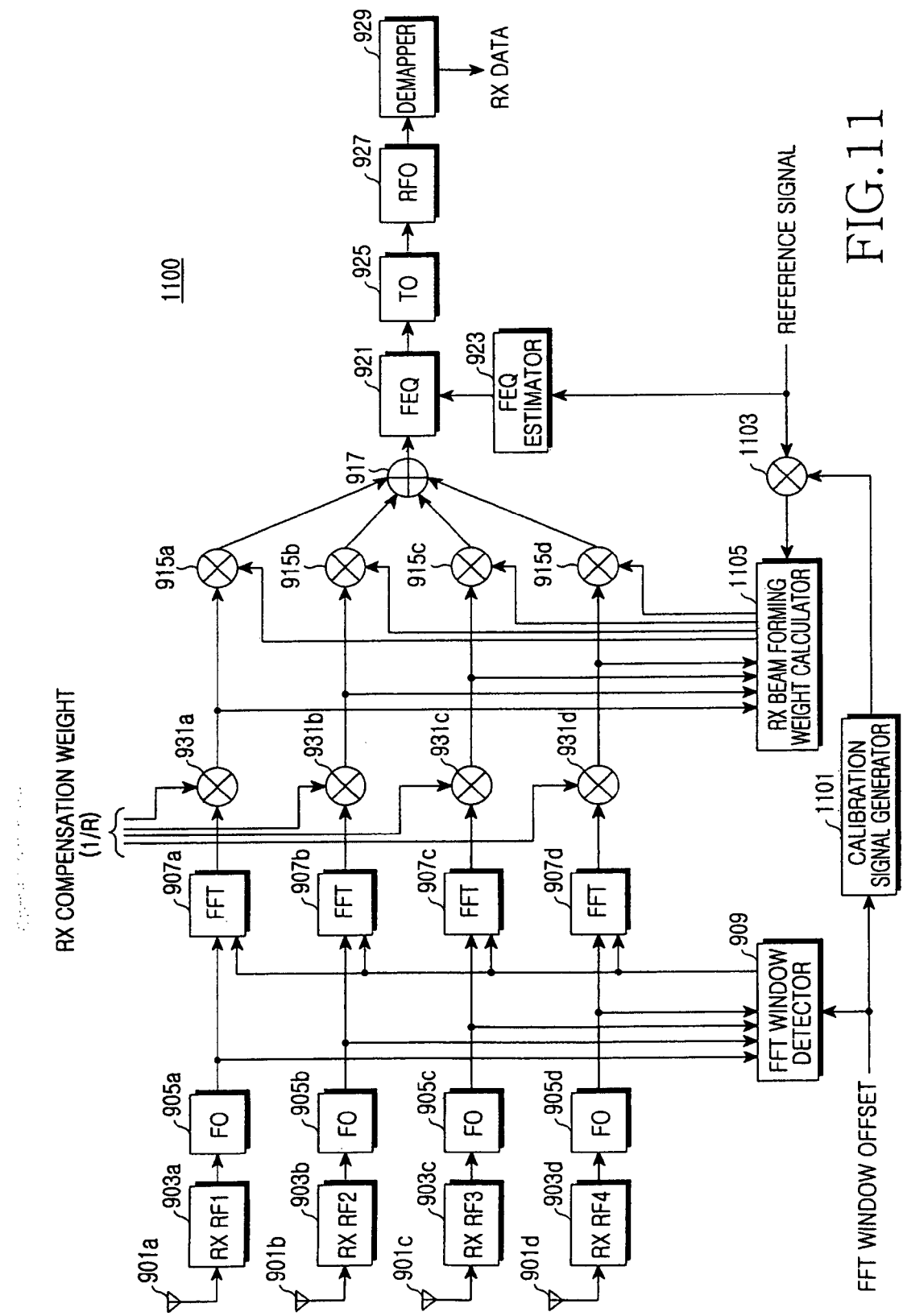
FIG. 11 is a block diagram illustrating a structure of a receiver of a base station in a smart antenna system according to another embodiment of the present invention.

FIG. 11 is a block diagram illustrating a structure of a receiver 1100 of a base station in a smart antenna system according to another embodiment of the present invention. In relation to FIG. 11, the same elements as those in FIG. 9 will be designated by the same reference numerals, and a detailed description thereof will thus be omitted.

Referring to FIG. 11, the frequency offset is eliminated from the incoming signals received by antennas 901a~901d when the signals pass through FOs 905a~905d. Thereafter, the signals are transferred to FFT units 907a~907d and input ports of an FFT window detector 909 for determining the window setup of the FFT units 907a~907d. For the signals input to the FFT units 907a~907d, it is necessary to determine the time point for the start of FFT. To this end, the FFT window detector 909 detects an exact OFDM symbol boundary from each of the outputs of the FOs 905a~905d, and sets an FFT window for each of the FFT units 907a~907d with a margin as large as a predetermined FFT window offset with reference to the detected symbol boundary.

In the present embodiment, the calibration signal generator 1101 receives the same value as the FFT window offset transferred to the FFT window detector 909 and generates the FFT window calibration signal. The generated calibration signal is multiplied by a reference signal for FEQ coefficient estimation by a multiplier 1103 and is then transferred to an RX beam forming weight calculator 1105. The RX beam forming weight calculator 1105 calculates an optimum RX beam forming weight for each antenna path by using the incoming signals output from the FFT units 907a~907d and the reference signal compensated based on the FFT window calibration signal. A more detailed description about the process of calculating the RX beam forming weight in the embodiment of FIG. 11 will be given later.

The calculated RX beam forming weights are multiplied by the incoming signals output from the FFT units 907a~907d by multipliers 915a~915d, so as to compensate for the phase rotation of the incoming signals, and the signals output from the multipliers 915a~915d added by an adder 917, so as to form an RX beam. The reference signal may be, for example, a long preamble signal, which is a reference training pattern signal defined in the wireless LAN standard IEEE Std 802.11a-1999. The operation after the stage of FEQ 912 in FIG. 11 is the same as that in FIG. 9, so a detailed description thereof will be omitted here.

Further, as in the embodiment of FIG. 9, in the embodiment of FIG. 11 also, when a transfer function characteristic of the receiver side is given as R, the frequency domain incoming signals output from the FFT units 907a~907d are multiplied by the RX beam calibration weights 1/R, so as to compensate for the transfer function characteristic R of the receiver side. In the present embodiment also, the use of the RX calibration weight is optional.

Figure 12:
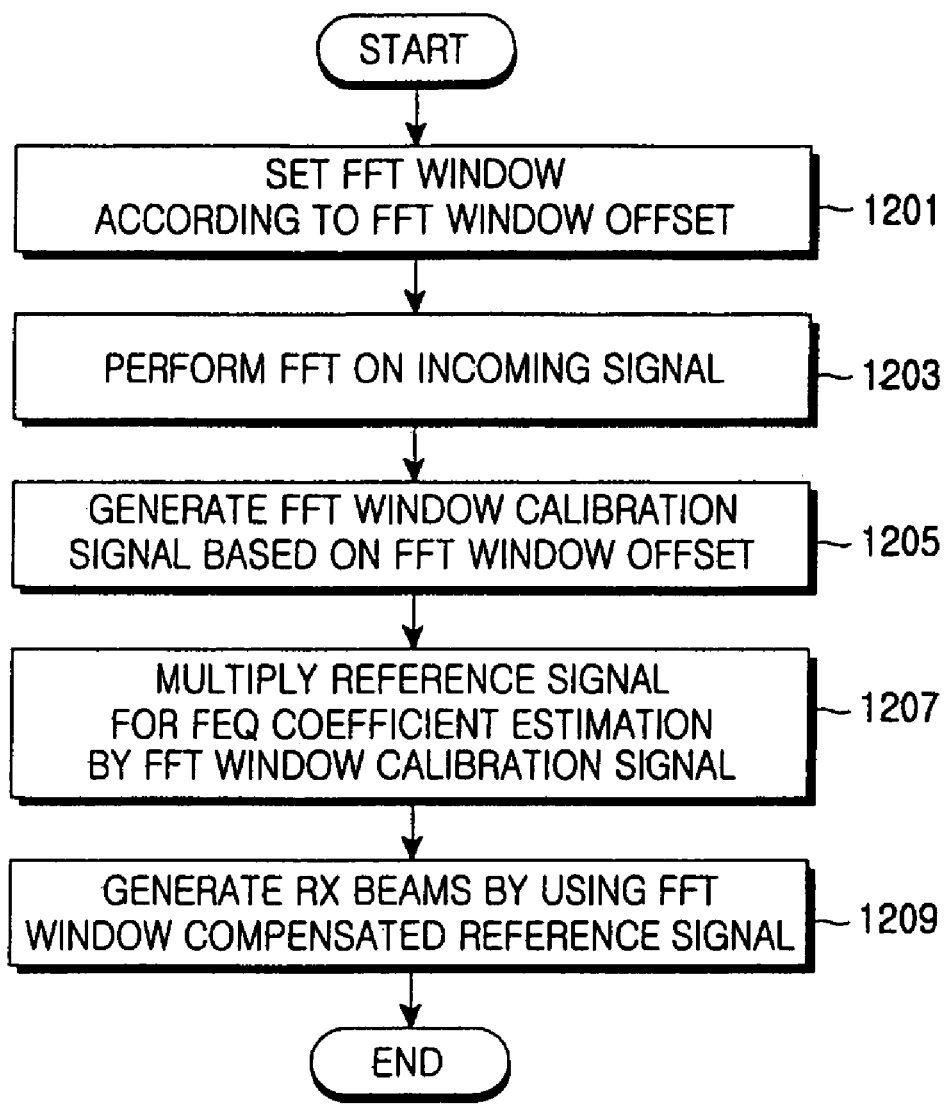
FIG. 12 is a flowchart of a method for compensating for phase rotation of an incoming signal by using an FFT window offset, which is applied to the receiver shown in FIG. 11.

FIG. 12 is a flowchart of a method for compensating for phase rotation of an incoming signal by using an FFT window offset, which is applied to the receiver 1100 shown in FIG. 11.

First, in step 1201, the FFT window detector 909 sets FFT windows for the FFT units 907a~907d with a margin as large as a predetermined FFT window offset. In step 1203, the FFT units 907a~907d perform FFT on the incoming signals in accordance with the setup FFT windows. Further, in the case of compensating for the transfer function characteristic R of the receiver side, the incoming signals output from the FFT units 907a~907d are multiplied by a predetermined RX calibration weight 1/R by the multipliers 931a~931d, respectively.

In step 1205, the calibration signal generator 911 receives the same value as the FFT window offset transferred to the FFT window detector 909 and generates FFT window calibration signals by using the value. Thereafter, in step 1207, the multiplier 1103 multiplies the reference signal for the FEQ coefficient estimation by the FFT window calibration signal. In step 1209, the RX beam forming weight calculator 1105 calculates an RX beam forming weight for each antenna path by using the reference signal having been compensated for the FFT window offset and the incoming signals output from the FFT units 907a~907d. The incoming signals through the antenna paths are multiplied by the RX beam forming weights of the corresponding paths, respectively, and are then added by the adder 917, so as to form an optimum RX beam.

Hereinafter, the process of calculating an RX beam forming weight in the embodiments of FIGS. 9 and 11 will be described in detail.

First, for better understanding of the present invention, a process of calculating an RX beam forming weight in a typical smart antenna system will be described.

Figure 1:
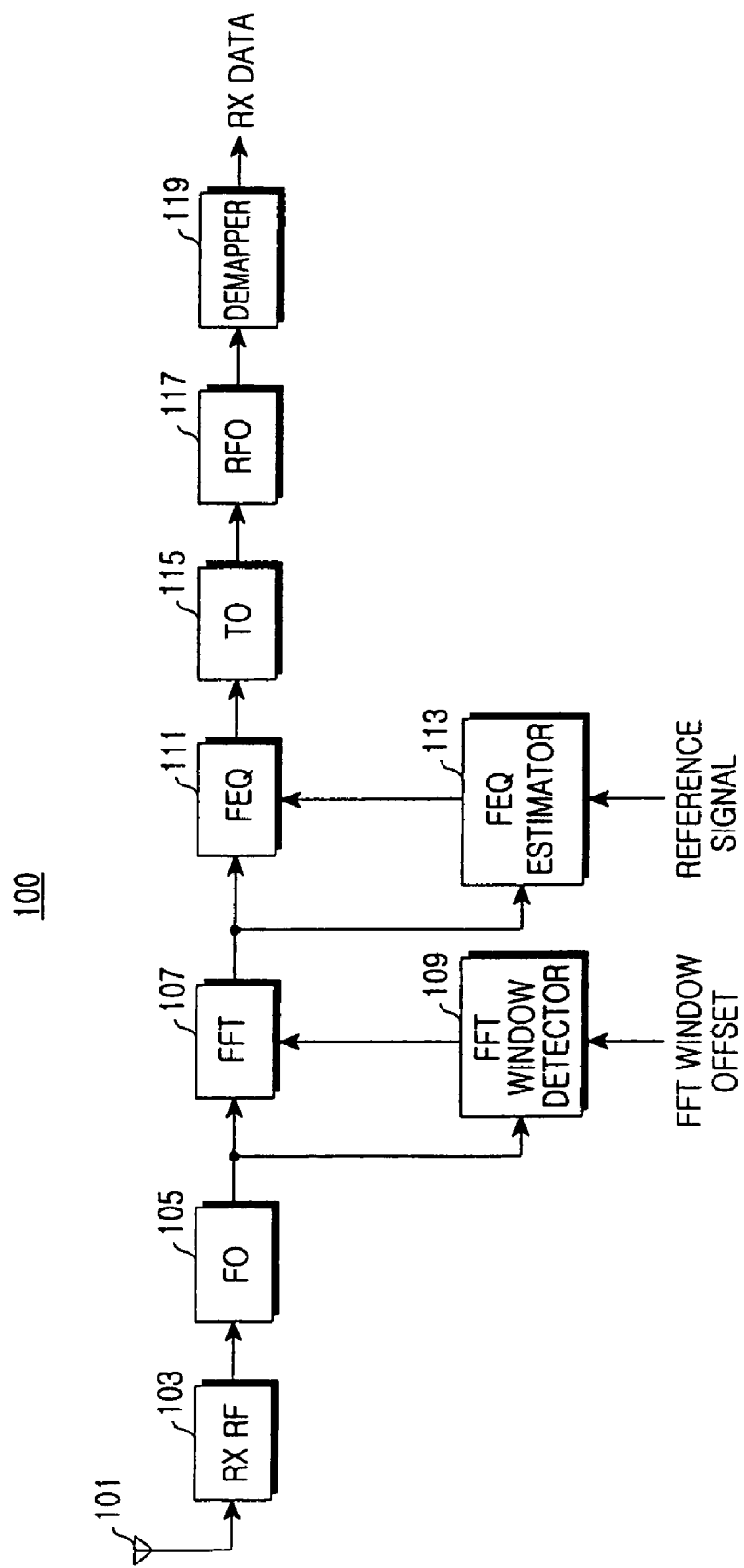
FIG. 1 is a block diagram illustrating a structure of a receiver of a mobile terminal in a downlink of a conventional smart antenna system.
Figure 2:
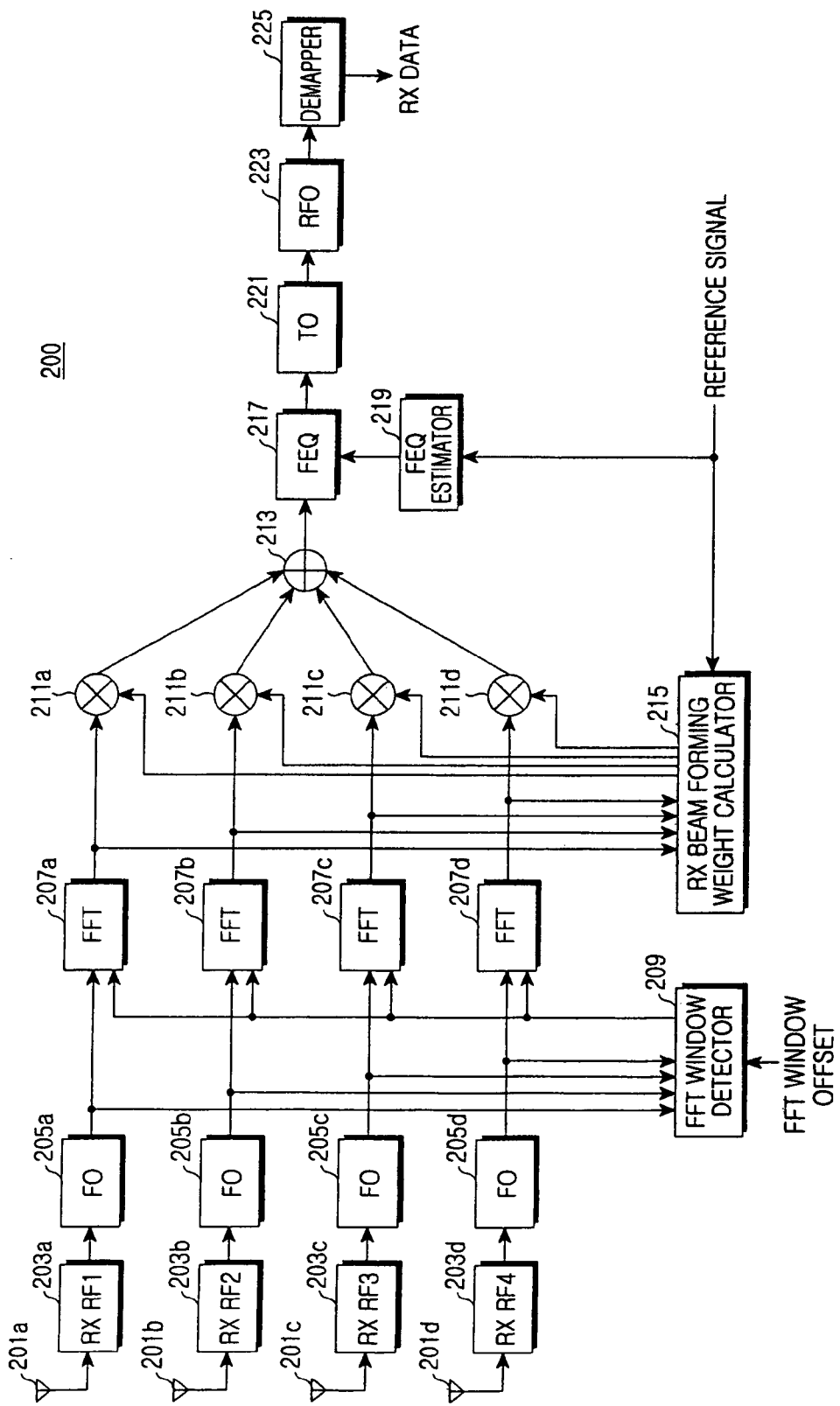
FIG. 2 is a block diagram illustrating a structure of a receiver of a base station in an uplink of a conventional smart antenna system.
Figure 3A:
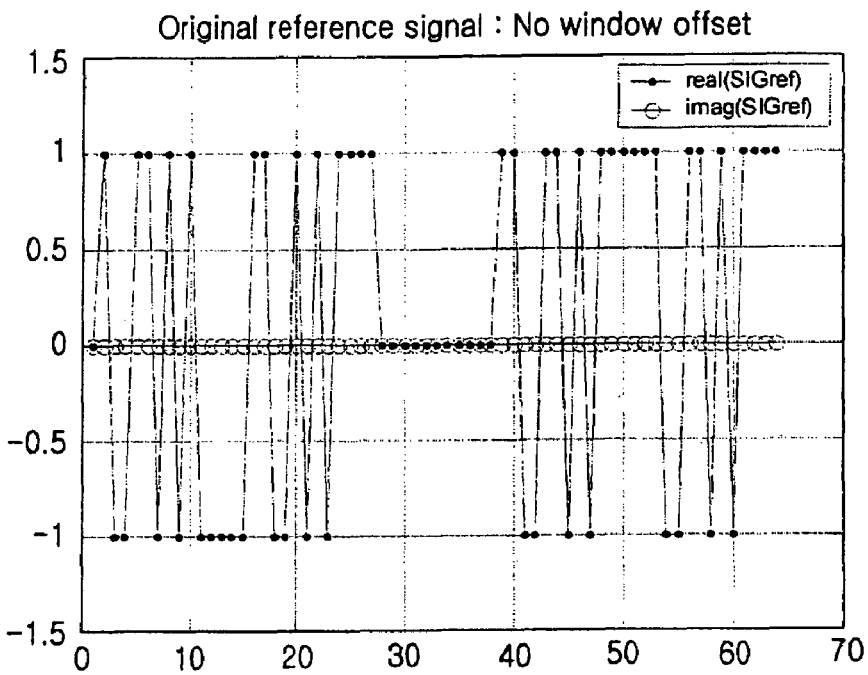
FIGS. 3A through 3C are waveform graphs for illustrating a reference signal for FEQ coefficient estimation when the FFT window offset is zero, an incoming signal, and a weight signal for RX beam formation in the receiver of FIG. 2, respectively.
Figure 3B:
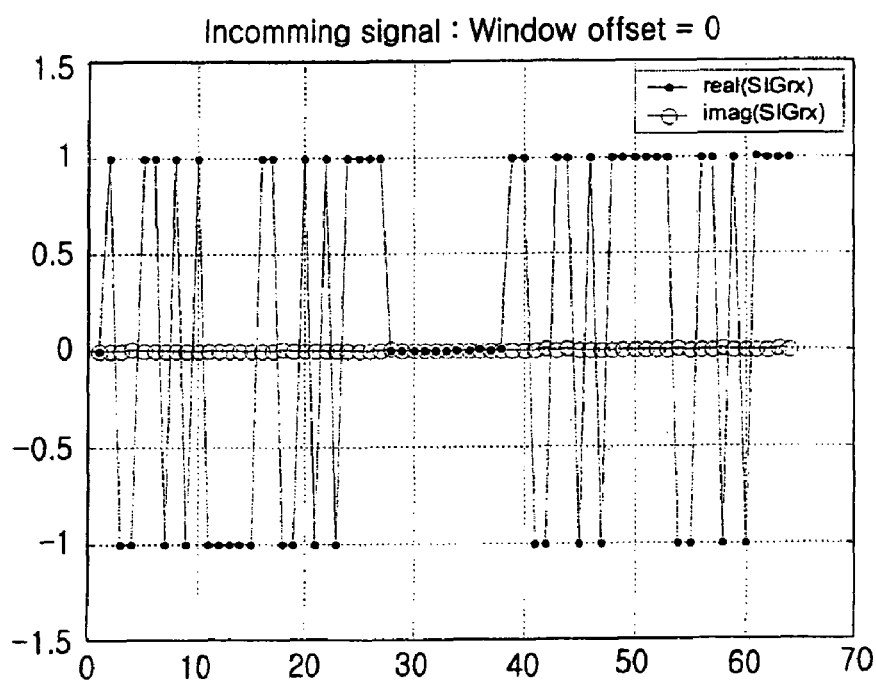
Figure 3C:
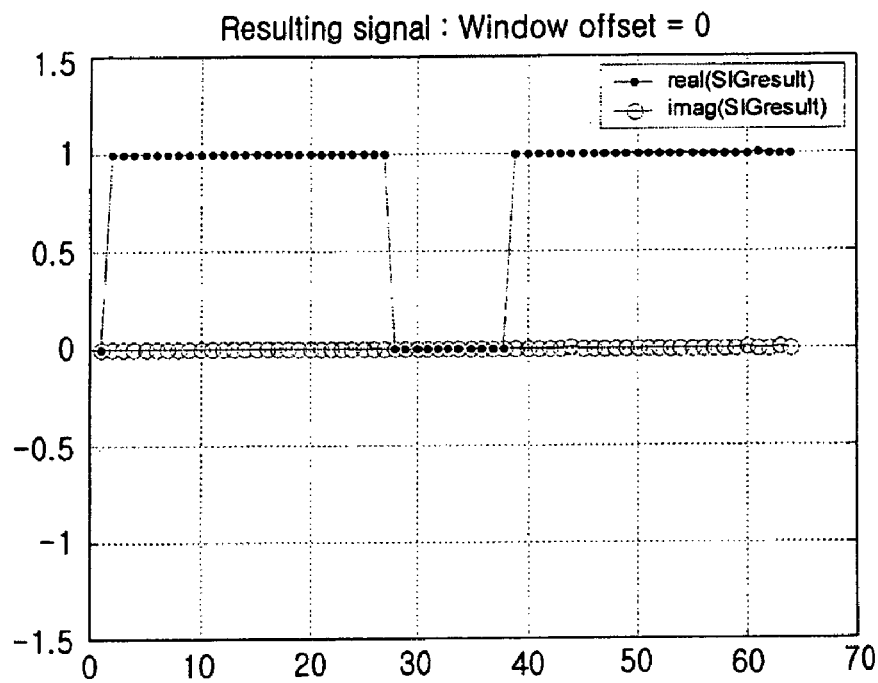
Figure 4A:
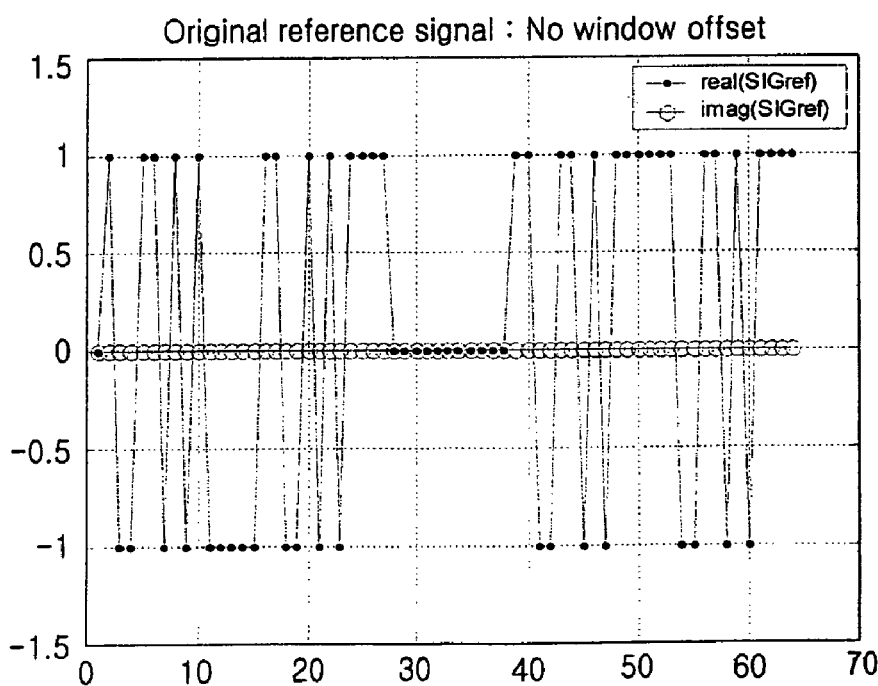
FIGS. 4A through 4C are waveform graphs for illustrating a reference signal for FEQ coefficient estimation, an incoming signal, and a weight signal for RX beam formation, respectively, when the FFT window offset is one in the receiver of FIG. 2.
Figure 4B:
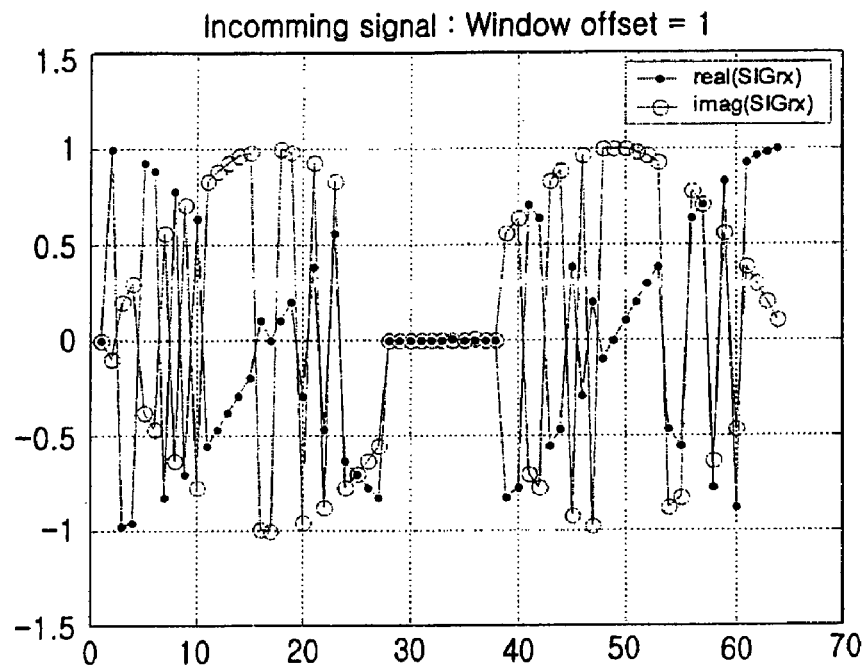
Figure 4C:
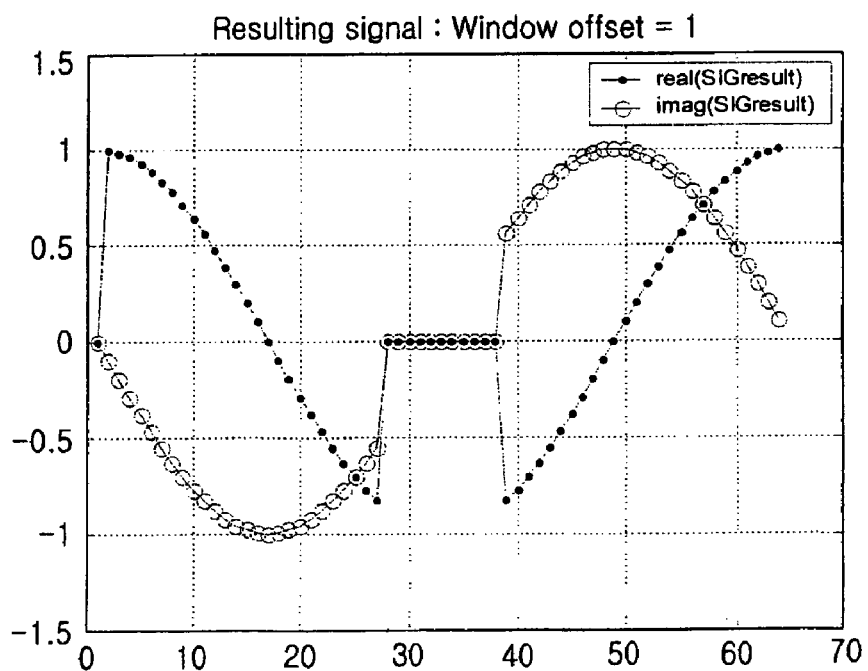

In the case of using M number of antennas and N number of reference signals, the RX beam forming weight calculator 215 of FIG. 2 can calculate the RX beam forming weights for the M antennas by using equation (2) as defined below.

$$\begin{bmatrix} a_{11} & a_{12} & \cdots & a_{1M} \\ a_{21} & a_{22} & \cdots & a_{2M} \\ \cdots & \cdots & \cdots & \cdots \\ a_{N1} & a_{N2} & \cdots & a_{NM} \end{bmatrix} \begin{bmatrix} w_{rx1} \\ w_{rx2} \\ \cdots \\ w_{rxM} \end{bmatrix} = \begin{bmatrix} p_1 \\ p_2 \\ \cdots \\ p_N \end{bmatrix} \quad (2)$$

For convenience of description, equation (2) can be simplified to equation (3) as shown below, which includes simplified corresponding items.

$$AW_{rx} = P \quad (3)$$

In equation (3), the N×M matrix A is an observation matrix which is observed from the incoming signal corresponding to the reference signal, the M column vector $W_{rx}$ denotes an RX beam forming weight to be obtained, and the N column vector P denotes the reference signal which has been understood in advance. Usually, the number of antennas M and the number of reference signals N are determined in consideration of the complexity and performance of the smart antenna system. For example, for 64 point FFT, the number of reference signals N may be determined as 64 (N=64).

Meanwhile, according to the present invention, in the case of using M antennas and N reference signals, the RX beam forming weight calculator 919 or 1105 of FIG. 9 or 11 can calculate the RX beam forming weights for the M antennas by using equation (4) or (5) as defined below.

First, in the case of applying a window offset calibration signal to incoming signals in order to compensate for the FFT window offset as in the embodiment shown in FIG. 9, it is possible to calculate the RX beam forming weight by using equation (4) below.

$$\begin{bmatrix} a_{11}e^{jw_o2\pi/N} & a_{12}e^{jw_o2\pi/N} & \cdots & a_{1M}e^{jw_o2\pi/N} \\ a_{21}e^{jw_o2\pi 2/N} & a_{22}e^{jw_o2\pi 2/N} & \cdots & a_{2M}e^{jw_o2\pi 2/N} \\ \cdots & \cdots & \cdots & \cdots \\ a_{N1}e^{jw_o2\pi N/N} & a_{N2}e^{jw_o2\pi N/N} & \cdots & a_{NM}e^{jw_o2\pi N/N} \end{bmatrix} \begin{bmatrix} w_{rx1} \\ w_{rx2} \\ \cdots \\ w_{rxM} \end{bmatrix} = \begin{bmatrix} p_1 \\ p_2 \\ \cdots \\ p_N \end{bmatrix} \quad (4)$$

Further, in the case of applying a window offset calibration signal to a reference signal in order to compensate for the FFT window offset as in the embodiment shown in FIG. 11, it is possible to calculate the RX beam forming weight by using equation (5) below.

$$\begin{bmatrix} a_{11} & a_{12} & \cdots & a_{1M} \\ a_{21} & a_{22} & \cdots & a_{2M} \\ \cdots & \cdots & \cdots & \cdots \\ a_{N1} & a_{N2} & \cdots & a_{NM} \end{bmatrix} \begin{bmatrix} w_{rx1} \\ w_{rx2} \\ \cdots \\ w_{rxM} \end{bmatrix} = \begin{bmatrix} p_1 e^{-jw_o2\pi/N} \\ p_2 e^{-jw_o2\pi 2/N} \\ \cdots \\ p_N e^{-jw_o2\pi N/N} \end{bmatrix} \quad (5)$$

In equations (4) and (5) in view of the simplified equation (3), the N×M matrix A is an observation matrix which is observed from the incoming signal corresponding to the reference signal, the M column vector W, denotes an RX beam forming weight to be obtained, and the N column vector P denotes the reference signal which has been understood in advance. In the N column vector P, the item $e^{jw_o2\pi n/N}$ or $e^{-jw_o2\pi n/N}$, n=1, 2, . . . , N is a compensation item for the window offset $w_o$. In the present invention also, it is possible to determine the number of antennas M and the number of reference signals N in consideration of the complexity and performance of the smart antenna system. For example, for 64 point FFT, the number of reference signals N may be determined as 64 (N=64). However, for example, in the case of the IEEE Std 802.11a-1999 which is a standard for the wireless LAN, the actually effective column vector $N_{effect}$ has 52 rows ($N_{effect}$=52). Otherwise, instead of the effective column vector $N_{effect}$, a column vector having four rows ($N_{sub}$=4), which is obtained by dividing the effective column vector rows $N_{effect}$ into vectors of sub-bands in consideration of the performance and complexity of the system, may be used. Therefore, instead of obtaining a solution in the case of $N_{effect}$=52, it is possible to obtain and use 13 sets of solutions for the case of $N_{sub}$=4.

FIGS. 13A through 13H are waveform graphs for illustrating a process for forming an RX beam forming weight by compensating for an FFT window offset, for example, when the FFT window offset is 1, in a smart antenna system according to the present invention.

Figure 13A:
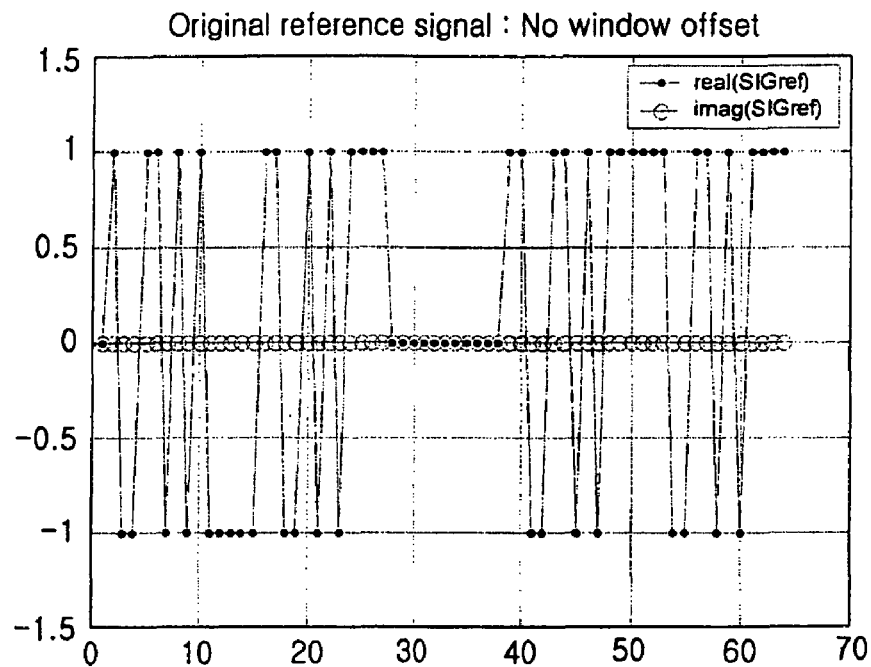
FIGS. 13A through 13H are waveform graphs for illustrating a process for forming an RX beam forming weight by compensating for an FFT window offset, for example, when the FFT window offset is 1, in a smart antenna system according to the present invention.
Figure 13B:
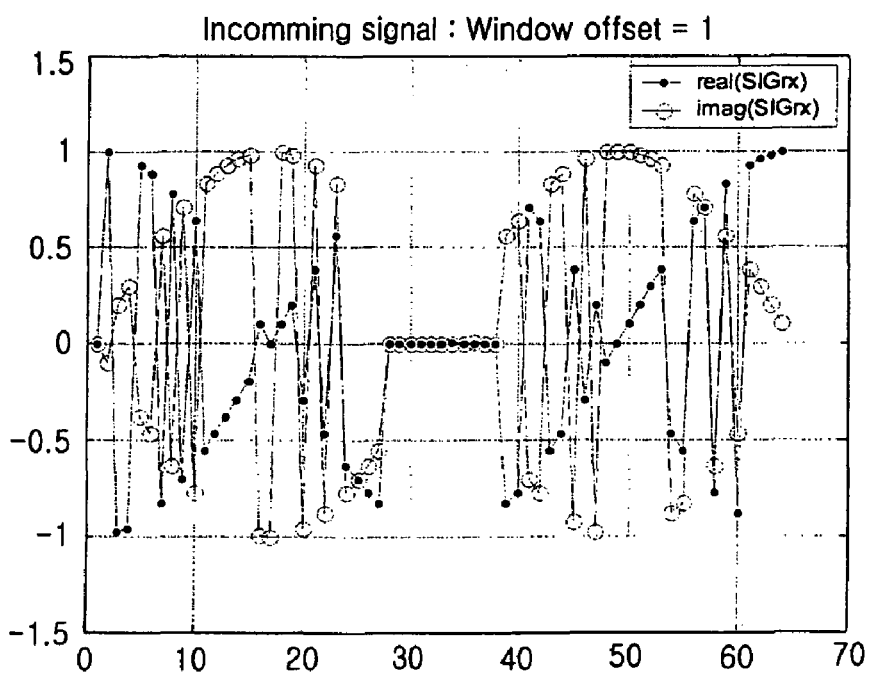
Figure 13C:
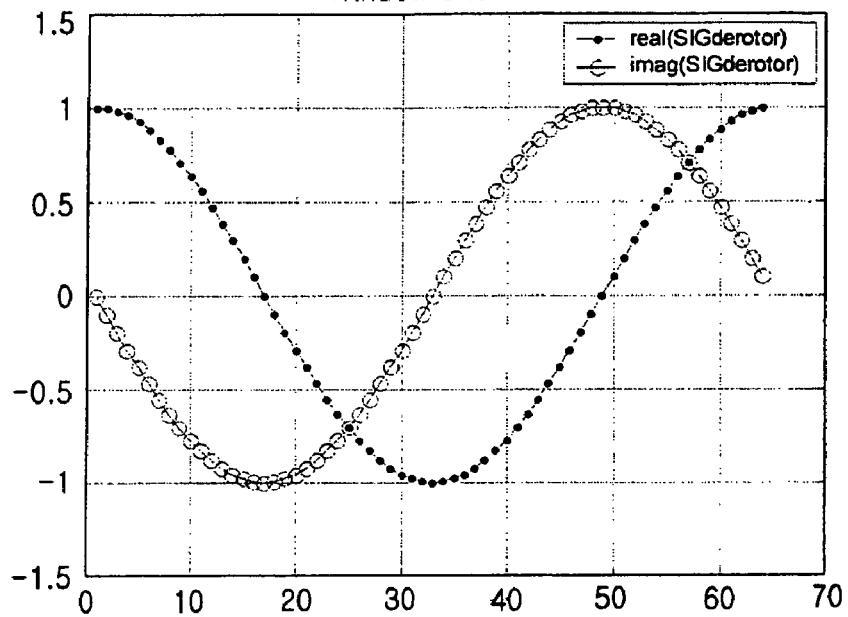
Figure 13D:
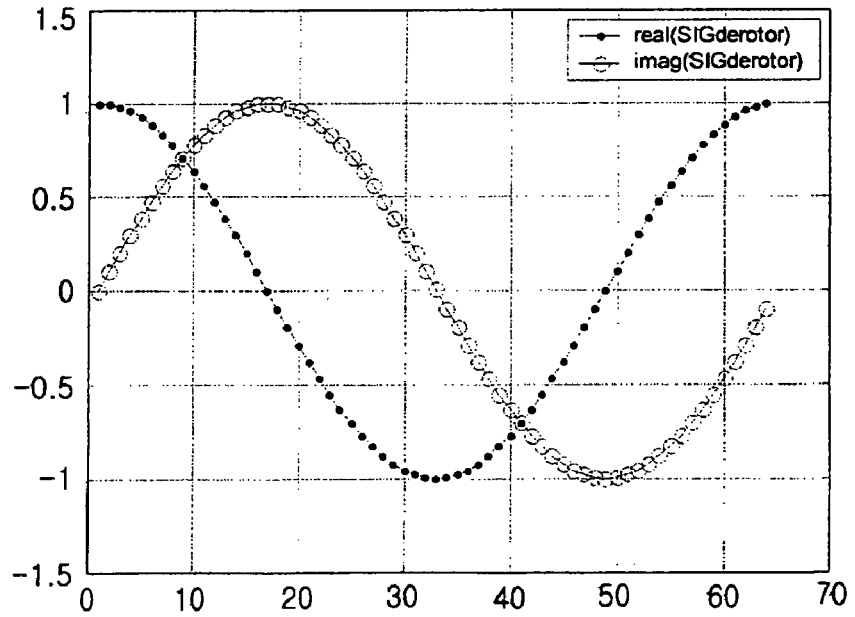
Figure 13E:
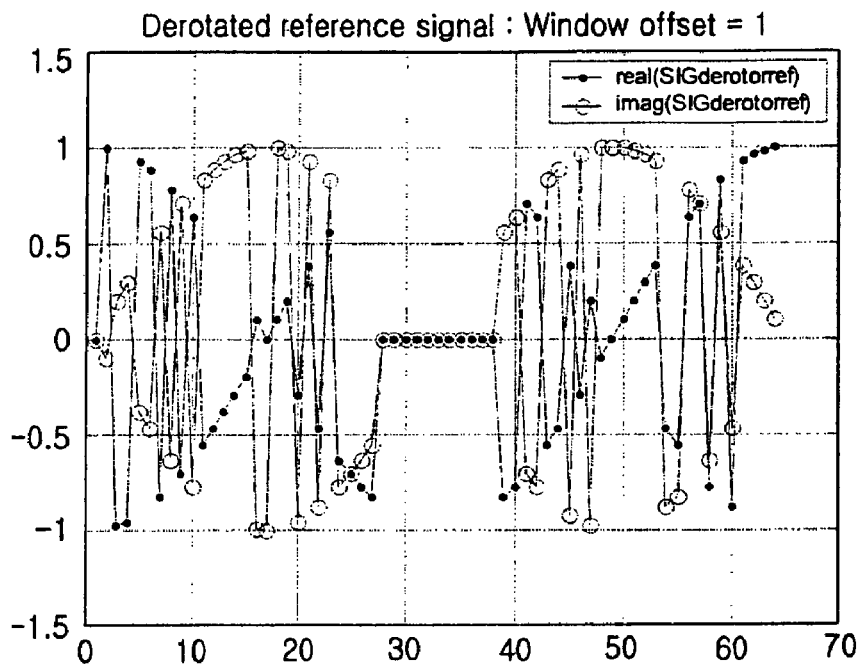
Figure 13F:
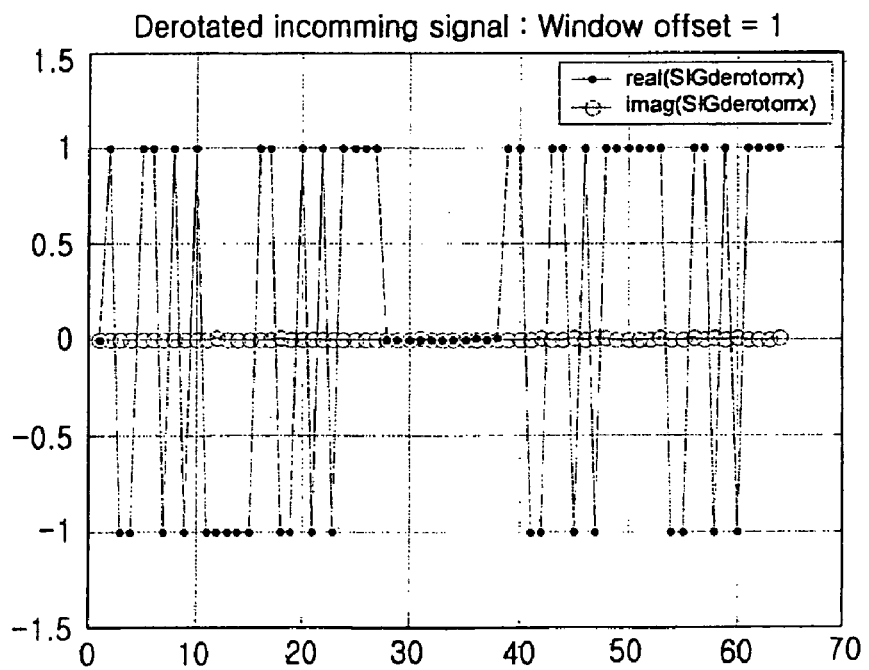

FIG. 13A illustrates a reference signal used in FEQ coefficient estimation in the case where the array antennas include four antennas and the FFT window offset is 0 sample, FIG. 13B illustrates an incoming signal corresponding to the reference signal of FIG. 13A, which is output from each of the FFT units 907a~907d. FIG. 13C illustrates an FFT window calibration signal for the reference signal, which is output from the calibration signal generator 1101, and FIG. 13D illustrates an FFT window calibration signal for the incoming signals, which is output from the calibration signal generator 901. Further, FIG. 13E illustrates a signal obtained by compensating the reference signal by the FFT window calibration signal, which is output from the multiplier 1103 of FIG. 11. FIG. 13F illustrates signals obtained by compensating the incoming signals by the FFT window calibration signal, which are output from the multipliers 913*a*~913*d* of FIG. 9. Finally, FIG. 13G illustrates an RX beam forming weight as a resulting signal obtained by compensating a reference signal for the FFT window offset, and FIG. 13H illustrates an RX beam forming weight as a resulting signal obtained by compensating an incoming signal for the FFT window offset.

Figure 13G:
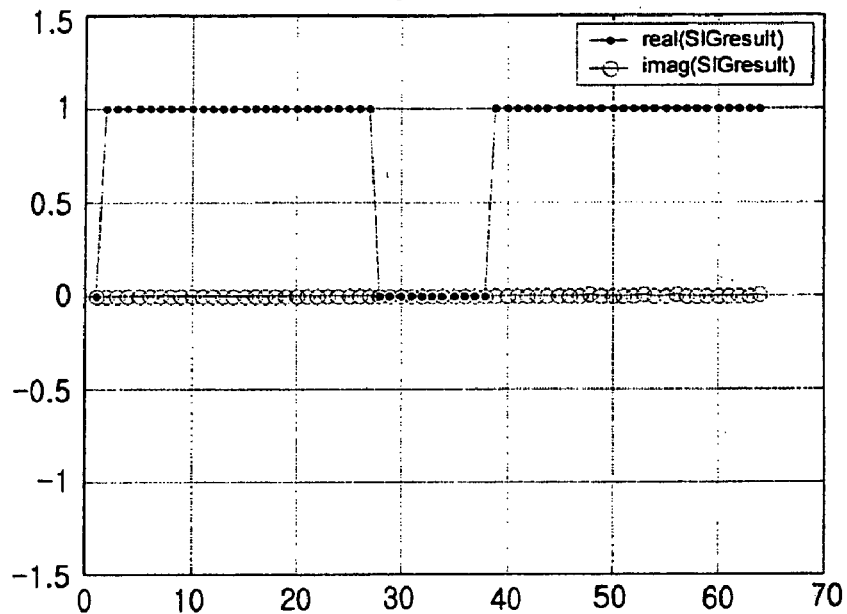
Figure 13H:
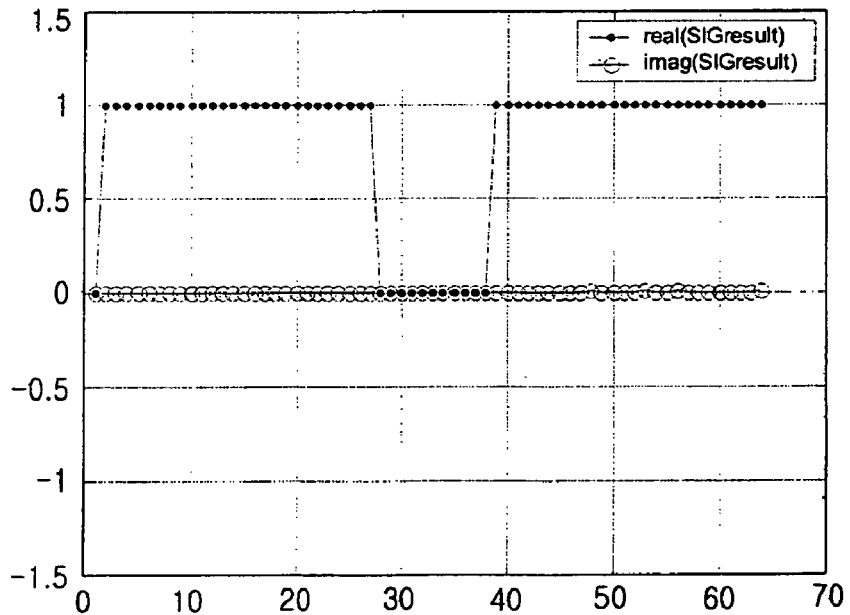

It is noted from FIGS. 13G and 13H that the same result is obtained regardless of whether the incoming signal or the reference signal is compensated for the FFT window offset, and that the phase rotation due to the window offset has been compensated. Meanwhile, the RX beam forming weight obtained in the way as shown in FIGS. 13G and 13H can be used to obtain a TX beam forming weight.

According to the present invention as described above, because an RX beam forming weight is obtained for the signal having been compensated for the FFT window offset, it is possible to prevent degradation of the system performance due to the FFT window offset when forming the RX beam. Further, according to the present invention, because the RX beam forming weight can eliminate the influence of the FFT window offset when the TX beam forming weight is obtained by using the RX beam forming weight, it is possible to prevent additional degradation of the performance.

Hereinafter, the second viewpoint of the present invention, which proposes a scheme in which a transmitter of a mobile terminal using a single antenna in a smart antenna system transmits data by using an FEQ coefficient estimated by a receiver of the mobile terminal, will be described with reference to FIGS. 14 and 15.

Figure 14:
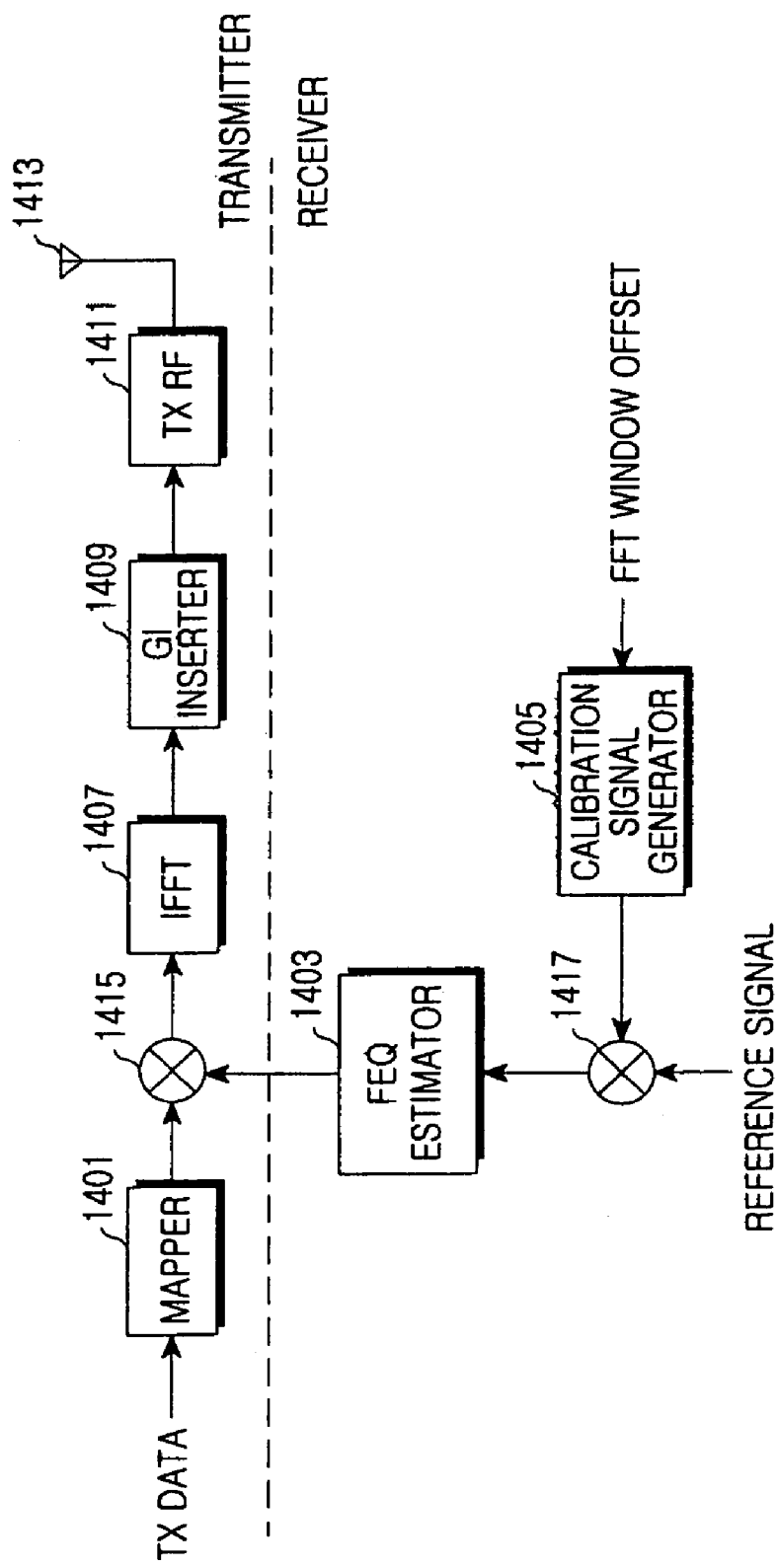
FIG. 14 is a block diagram illustrating a structure of a transmitter of a mobile terminal which uses a TX FEQ weight in a smart antenna system according to the present invention.

FIG. 14 is a block diagram illustrating a structure of a transmitter of a mobile terminal which uses a TX FEQ weight in a smart antenna system according to the present invention. The FEQ coefficient estimated by the receiver side of the mobile terminal is transferred to both the FEQ 515 as shown in FIGS. 5 and 7 and the multiplier 1415 of the transmitter side as shown in FIG. 14. As used herein, the FEQ coefficient transferred from the receiver of the mobile terminal to the transmitter will be referred to as "TX FEQ." That is, as the TX FEQ weight of the transmitter, it is possible to use an FEQ coefficient estimated by an FEQ estimator of the receiver having the structure as shown in FIG. 5 or 7.

Therefore, it should be understood that the FEQ estimator 1403, the calibration signal generator 1405, and the multiplier 1417 in FIG. 14 correspond to the FEQ estimator 517, the calibration signal generator 701, and the multiplier 703 in the receiver of FIG. 7, respectively. Because the TX FEQ weight for the transmitter side of the mobile terminal is obtained by using the FEQ coefficient of the receiver side having been compensated for the FFT window offset as described above, even a mobile terminal which does not have a smart array antenna can improve the reception performance of a base station in an uplink by compensating for the multi-path of a radio channel.

Hereinafter, an operation of an apparatus having the structure as shown in FIG. 14 will be described. The TX data to be transmitted from a mobile terminal to a base station is mapped by a mapper 1401 according to a predetermined modulation scheme, such as QPSK, 16QAM, etc., and is multiplied by a TX FEQ weight transferred from an FEQ estimator 1403 by a multiplier 1415.

The TX FEQ weight is obtained from a predetermined channel transfer function which is obtained by the FEQ estimator 1403 of the receiver side. For example, when the channel transfer function obtained by the FEQ estimator 1403 is H(f), the TX FEQ weight is obtained by H(f) or H*(f). At this time, the calibration signal generator 1405 receives the FFT window offset value and generates an FFT window calibration signal, which is multiplied by a predetermined reference signal for the FEQ coefficient estimation of the receiver by the multiplier 1417 and is then transferred to the FEQ estimator 1403. The reference signal may be, for example, a long preamble signal, which is a reference training pattern signal defined in the wireless LAN standard IEEE Std 802.11a-1999. The outgoing signal having been multiplied by the TX FEQ weight by the multiplier 1415 is transmitted through an IFFT unit 1407, a Guard Interval (GI) inserter 1409, a TX RF unit 1411, and an antenna 1413 to a radio network.

Meanwhile, the structure shown in FIG. 14 corresponds to the structure of the receiver shown in FIG. 7, and a detailed description about the structure shown in FIG. 14 will be omitted here because it can be easily understood from the embodiment to use the FEQ coefficient estimated from the receiver of FIG. 5 as the TX FEQ weight.

Figure 15A:
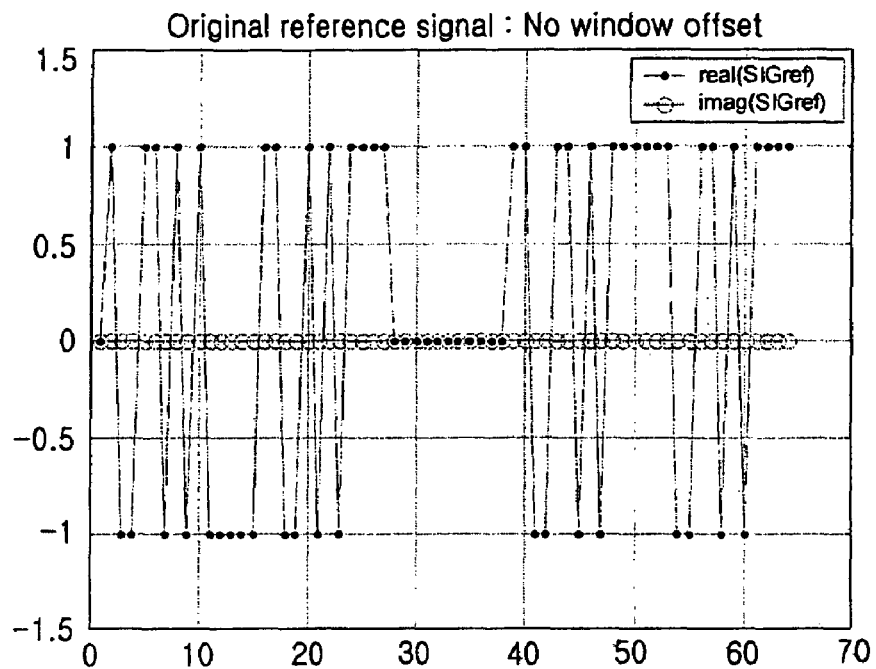
FIGS. 15A through 15I are waveform graphs for illustrating a process for obtaining an FEQ coefficient, i.e. a TX FEQ weight, when the FFT window offset is 1 in the transmitter of FIG. 14.
Figure 15B:
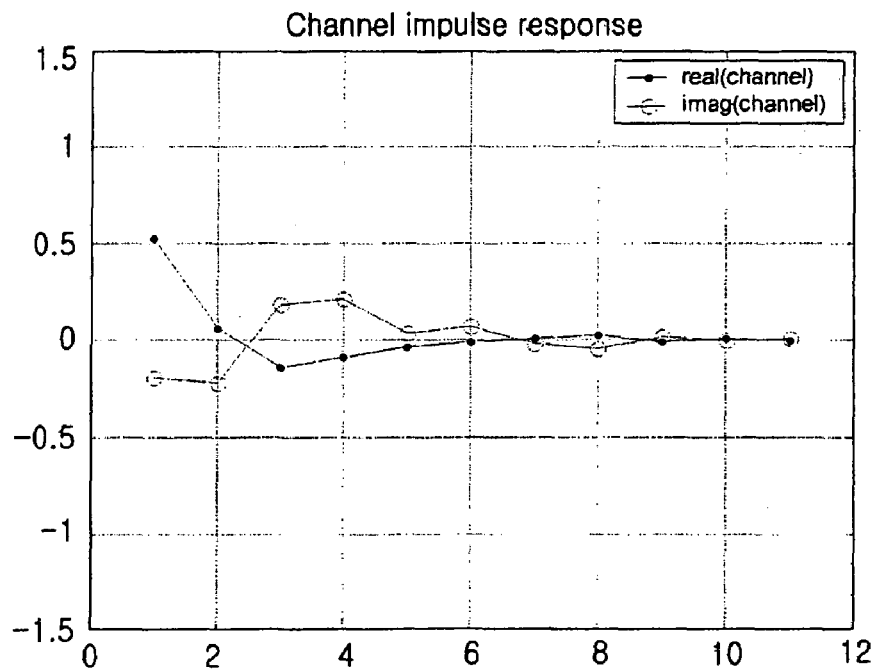
Figure 15C:
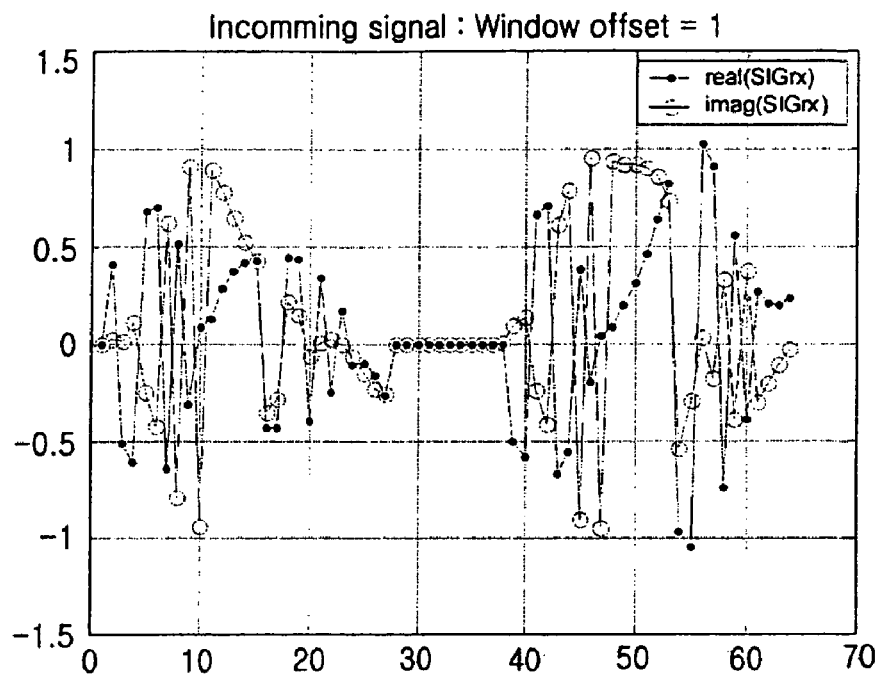
Figure 15D:
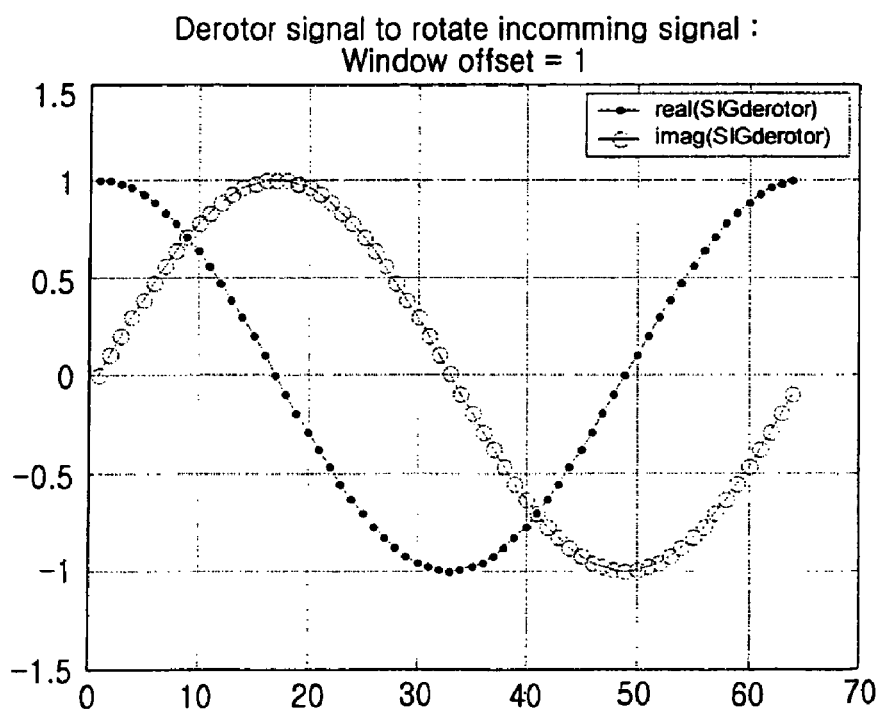
Figure 15E:
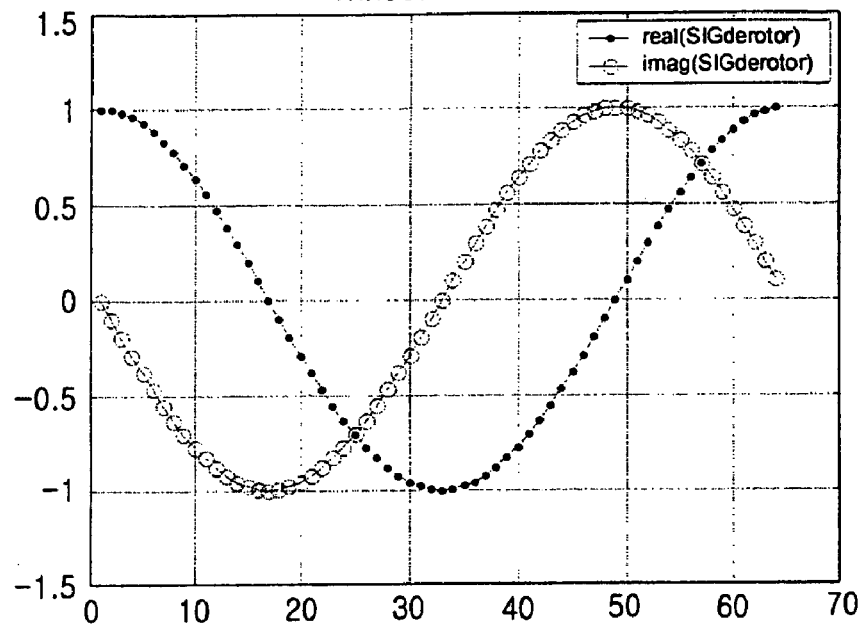
Figure 15F:
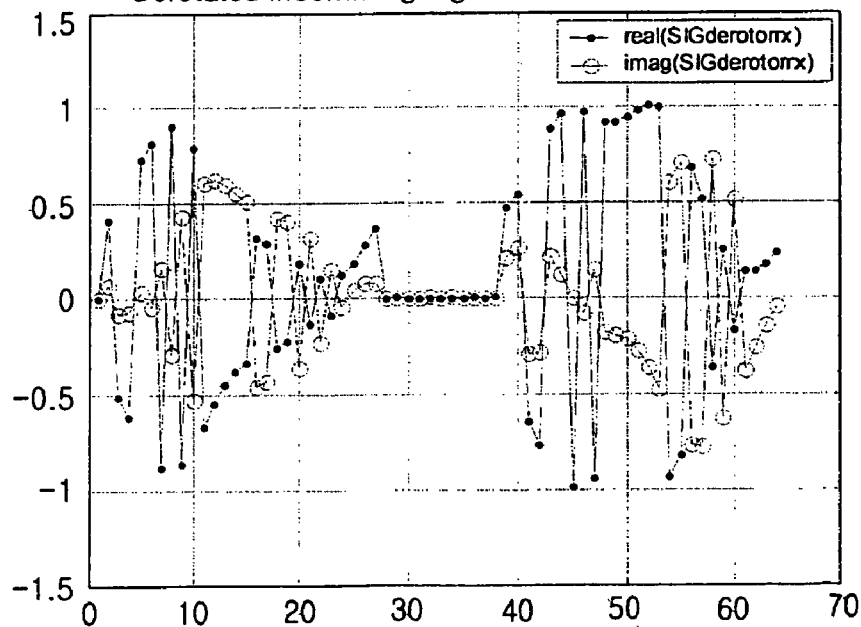
Figure 15G:
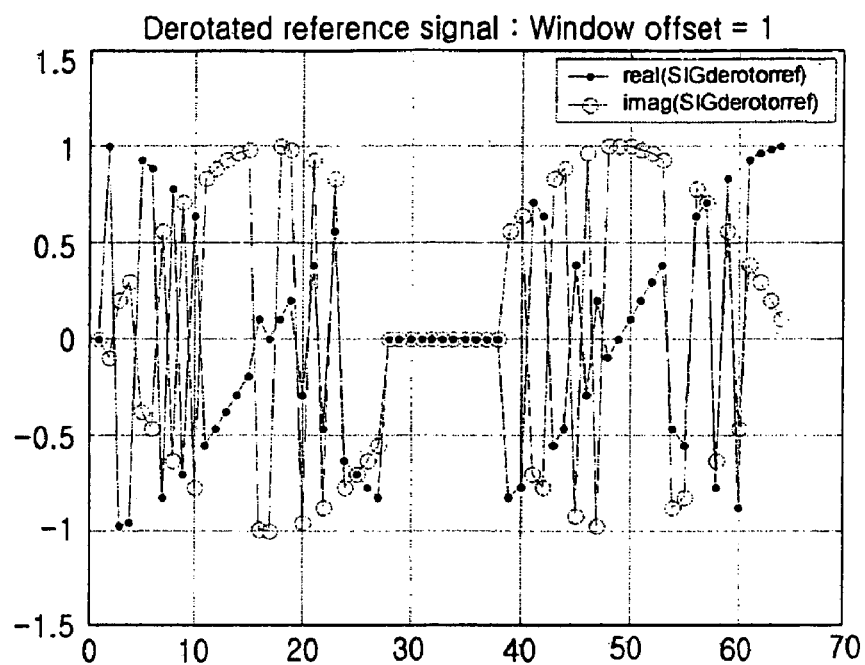
Figure 15H:
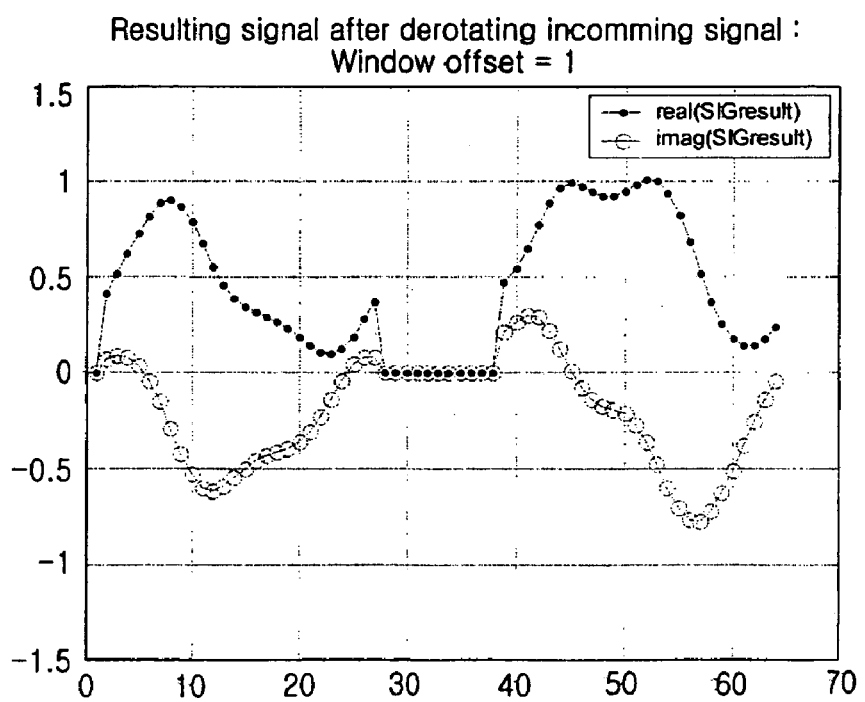
Figure 15I:
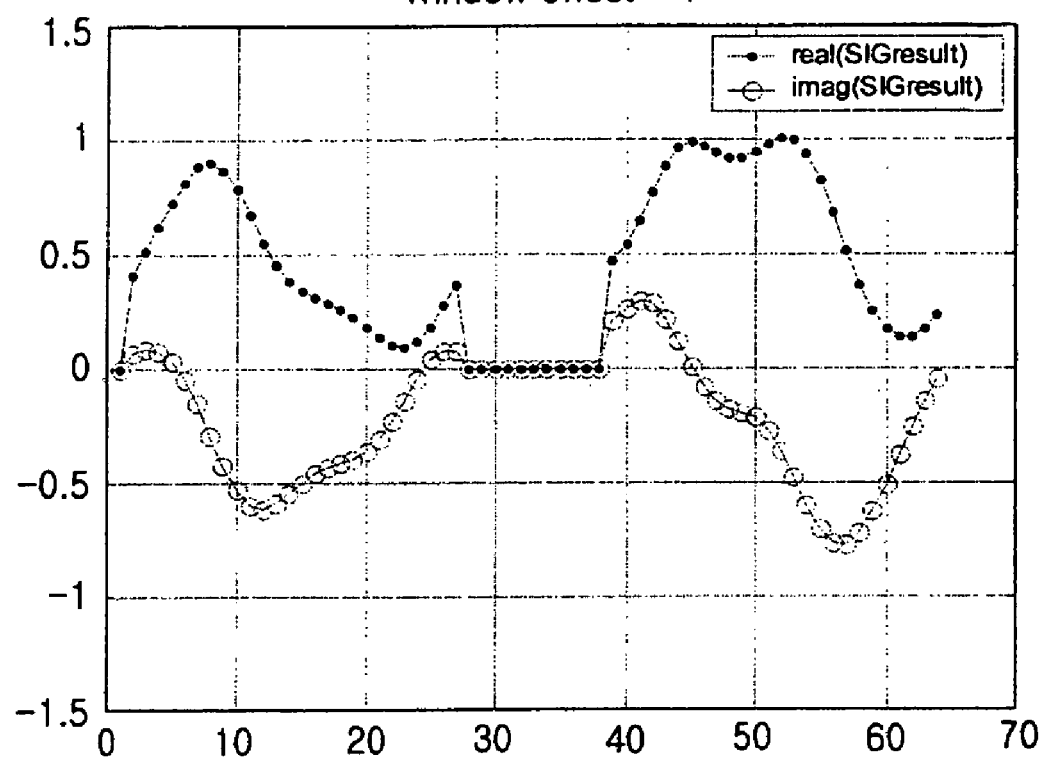
Figure 16:
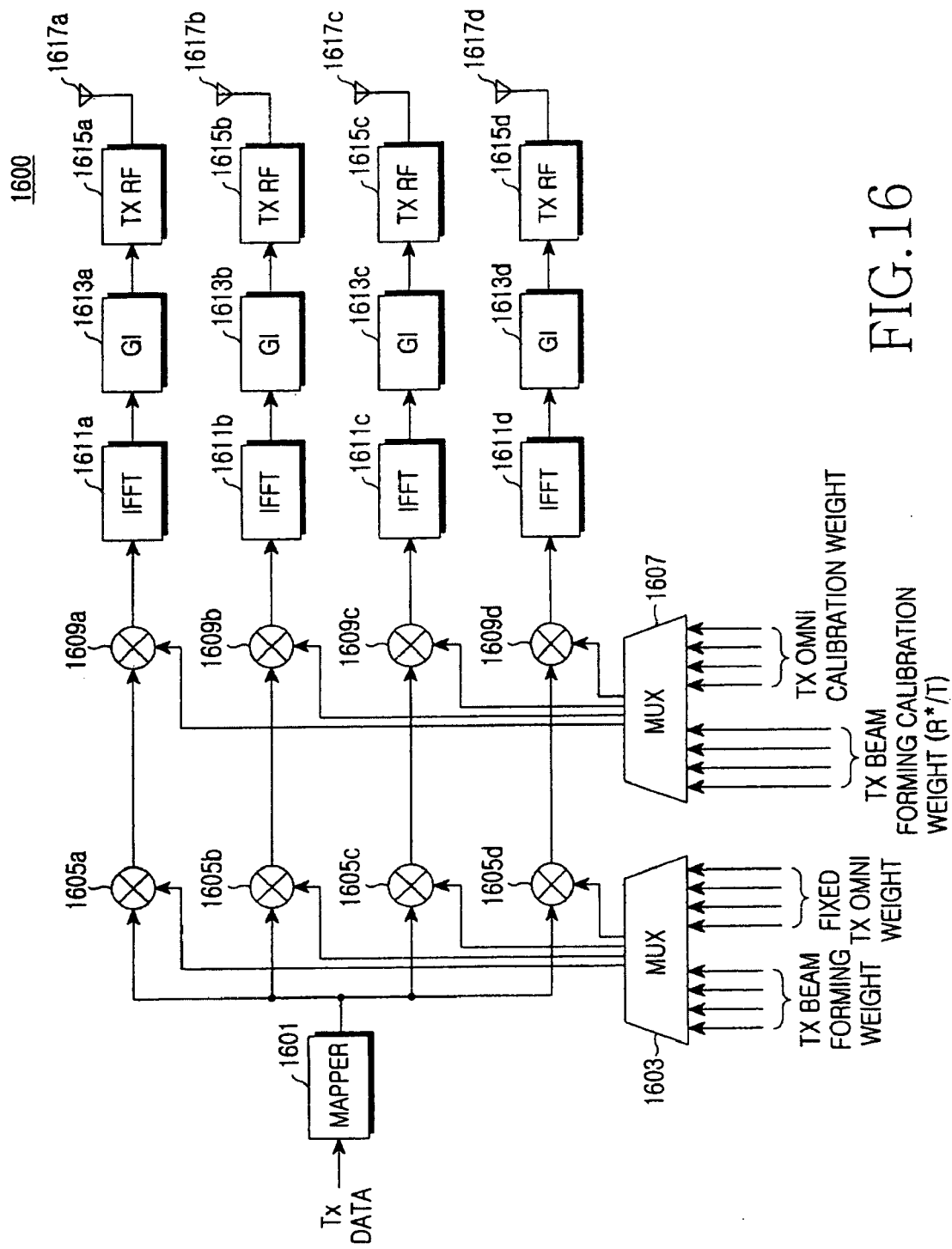
FIG. 16 is a block diagram showing the structure of a transmitter in a downlink of a conventional smart antenna system.

FIGS. 15A through 15I are waveform graphs for illustrating a process for obtaining an FEQ coefficient, i.e. a TX FEQ weight, when the FFT window offset is 1 in the transmitter of FIG. 14. FIG. 15A illustrates a reference signal used in the receiver, FIG. 15B illustrates a channel impulse response of the wireless channel of FIG. 15A, and FIG. 15C illustrates an incoming signal output from an FFT unit of the receiver. Further, FIG. 15D illustrates an FFT window calibration signal for the incoming signal, and FIG. 15E illustrates an FFT window calibration signal for the reference signal. FIG. 15F illustrates a signal obtained by compensating the incoming signal for the FFT window offset, and FIG. 15G illustrates a signal obtained by compensating the reference signal for the FFT window offset. FIG. 14H illustrates an RX FEQ coefficient obtained by using the signal obtained by compensating the incoming signal for the FFT window offset, and FIG. 15I illustrates an RX FEQ coefficient obtained by using the signal obtained by compensating the reference signal for the FFT window offset.

It is noted from FIGS. 15H and 15I that it is possible to obtain the same RX FEQ coefficient regardless of whether the incoming signal or the reference signal is compensated for the FFT window offset. Further, the RX FEQ coefficient obtained as shown in FIG. 15H or 15I is used to obtain the TX FEQ weight. The TX FEQ weight is multiplied by the outgoing signal output from the mapper 1401 by the multiplier 1415, so as to compensate for the radio channel. According to the present invention as described above, in which the TX FEQ weight is obtained from the FEQ coefficient and is applied in a transmitter of a mobile terminal, even a mobile terminal which does not use a smart array antenna can compensate for the radio channel for data transmission to a base station, so that the base station can perform a more reliable demodulation of data, thereby improving the performance of the entire system.

Hereinafter, the third viewpoint of the present invention, which proposes a scheme for generating a variable omni-directional beam pattern by a base station of a smart antenna system, will be described with reference to FIGS. 17 and 19.

Figure 17:
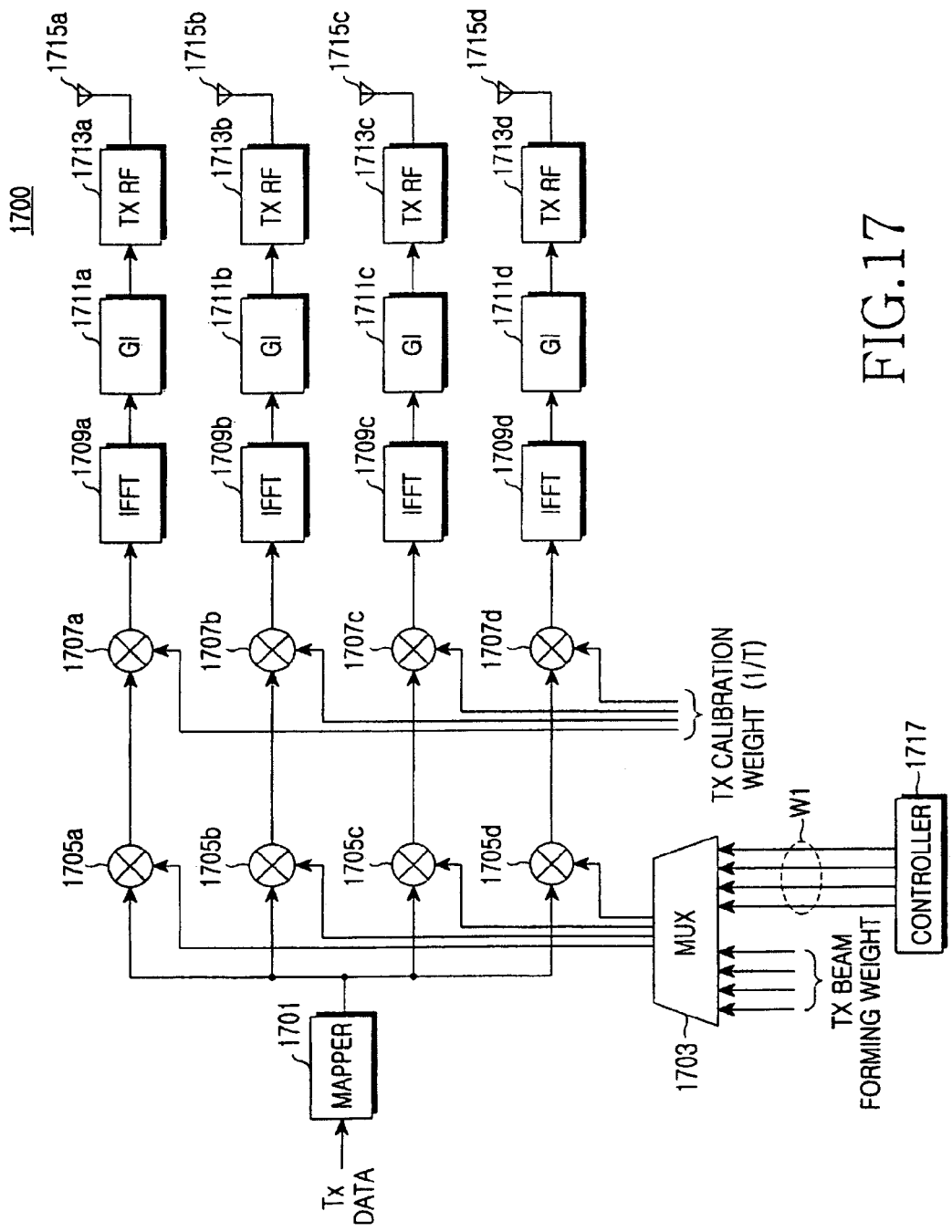
FIG. 17 is a block diagram illustrating a structure of a transmitter of a base station in a smart antenna system according to an embodiment of the present invention.
Figure 18:
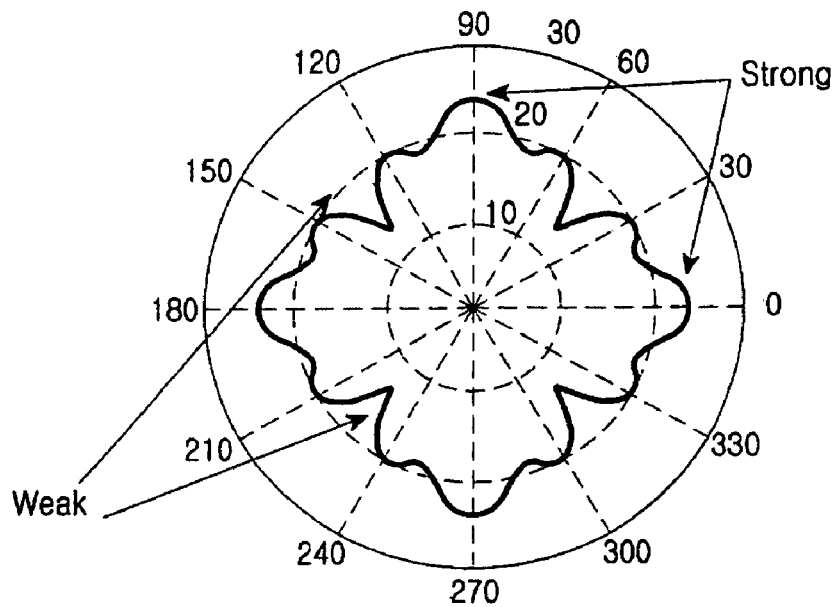
FIG. 18 is a waveform graph of an omni-directional beam pattern generated by using a smart antenna implemented by four antenna elements.

FIG. 17 is a block diagram illustrating a structure of a transmitter of a base station in a smart antenna system according to an embodiment of the present invention.

TX data to be transmitted from the base station to a mobile terminal are mapped by a mapper 1701 according to predetermined modulation scheme, such as QPSK, 16QAM, etc., and are then multiplied by transmission weights output from a multiplier 1703 by multipliers 1705a~1705d. For the transmission weights, TX beam forming weights are used when a communication protocol performs the transmission beam formation, and variable TX omni weights (W1) are used when the communication protocol uses the omni-directional beam pattern according to the present invention. The signals obtained by multiplying the data by the transmission weights in the multipliers 1705a~1705d are multiplied by a TX calibration weight 1/T by multipliers 1707a~1707d in order to compensate for the transfer function characteristic of the transmitter side of the system. The TX calibration weight has the same value of 1/T when the transmission weights are either the TX beam forming weights or the variable TX omni weights.

As is in the prior art, in the present invention also, the TX beam forming weight is obtained by using the RX beam forming weight. However, in the present invention, the RX beam forming weight is obtained for the incoming signal to which the RX beam forming weight 1/R has been applied, as noted from the embodiments shown in FIGS. 9 and 11. Therefore, the RX beam forming weight does not include the R element which is a transfer function characteristic of the receiver side. As a result, it is enough to consider only the T element, which is the transfer function characteristic of the transmitter side, for the TX compensation weight, and it is thus enough to perform the compensation with a weight of 1/T. This implies that the present invention enables TX calibration by a simpler construction than that of the prior art. The signals after being multiplied by the TX calibration weights by the multipliers 1707a~1707d are transmitted to a radio network after passing through IFFT units 1790a~1709d, GI inserters 1711a~1711d for inserting GIs, TX RF units 1713a~1713d for performing RF processing such as frequency up-conversion, and antennas 1715a~1715d.

The TX beam forming weights are usually obtained by using the RX beam forming weights, and the variable TX omni weights are set to produce a beam pattern which is most similar to that of a typical omni-directional antenna beam pattern when the beam formation is achieved by, for example, a plurality of antenna elements. In the operation for generating the omni-directional beam pattern by using the variable TX omni weights, a controller 1717 controls the variable TX omni weights to circulate according to passage of time to generate omni-directional beam patterns having different characteristics.

FIGS. 19A through 19E are waveform graphs illustrating an example of variable omni-directional beam patterns generated in a smart antenna system according to an embodiment of the present invention.

Figure 19A:
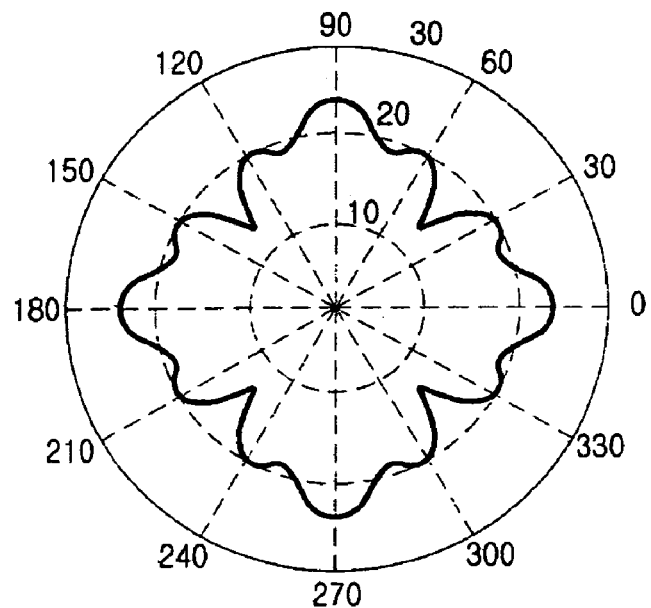
FIGS. 19A through 19E are waveform graphs illustrating an example of variable omni-directional beam patterns generated in a smart antenna system according to an embodiment of the present invention.
Figure 19B:
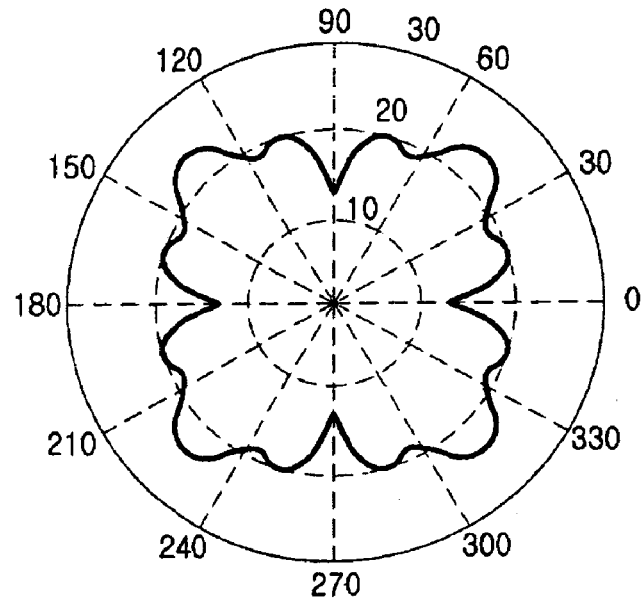
Figure 19C:
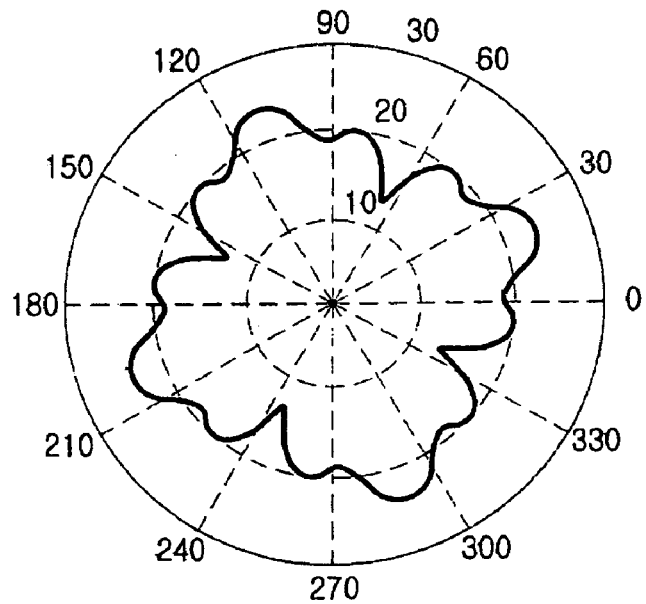
Figure 19D:
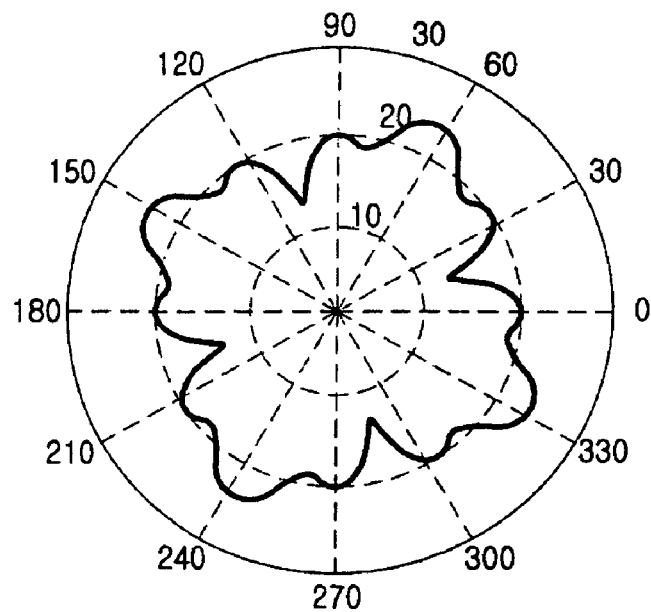
Figure 19E:
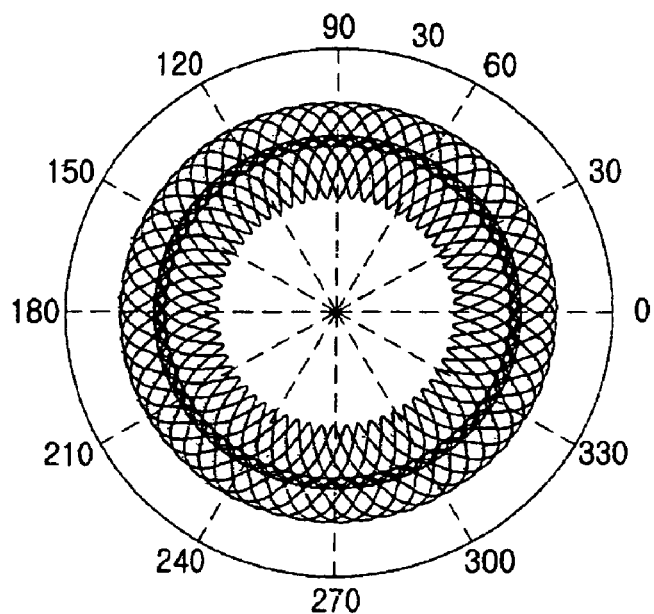

In the present invention, the omni-directional beam pattern generated by a smart antenna has a shape which is variable according to passage of time t0, t1, t2, . . . . FIG. 19A illustrates a beam pattern at a time slot t0, FIG. 19B illustrates a beam pattern at a time slot t1, FIG. 19C illustrates a beam pattern at a time slot t2, FIG. 19D illustrates a beam pattern at a time slot t3, and FIG. 19E illustrates overlapping beam patterns of multiple time slots. As noted from FIG. 19E, by using the variable omni weights (W1) proposed by the present invention, it is possible to generate a beam pattern which is uniform in all directions, i.e. in 360 degrees, and it is thus possible to have an effect in the case of using a nearly complete omni-directional beam pattern. Therefore, the present invention can easily solve the problem of the prior art, i.e. the problem of non-uniformity in the communication quality due to the non-uniform beam pattern.

According to the present invention as described above, it is possible to compensate for the phase rotation of an incoming signal due to the influence of the FFT window offset in a smart antenna system using an OFDM transmission scheme.

Further, according to the present invention as described above, it is possible to improve the RX/TX beam forming performance of a transmitter/receiver by compensating for the phase rotation due to the FFT window offset.

Further, according to the present invention as described above, it is possible to compensate for a radio channel even when a transmitter of a mobile terminal in a smart antenna system based on frequency domain signal processing uses a single antenna.

Further, according to the present invention as described above, it is possible to compensate for the multi-path channel by using an RX FEQ coefficient obtained by a receiver of a terminal as an FEQ weight of a transmitter of the terminal, so that it is possible to improve the reception performance of a base station.

Further, according to the present invention as described above, it is possible to generate a uniform non-directional beam by generating a variable omni-directional beam pattern in a smart antenna system.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A signal receiving apparatus of a base station in a smart antenna system which uses an Orthogonal Frequency Division Multiplexing (OFDM) communication scheme, the signal receiving apparatus comprising:
   a plurality of Fast Fourier Transform (FFT) units for performing FFT according to an FFT window on a plurality of incoming signals received through a plurality of antennas;
   an FFT window detector coupled to receive the plurality of incoming signals and a predetermined FFT window offset for detecting a boundary of an OFDM symbol and setting the FFT window with a margin as large as the predetermined FFT window offset with reference to the detected symbol boundary;
   a calibration signal generator for outputting an FFT window calibration signal based on the FFT window offset; and
   a plurality of first multipliers coupled to the plurality of FFT units and the calibration signal generator for multiplying each of the incoming signals output from the FFT units by the FFT window calibration signal.

2. The signal receiving apparatus as claimed in claim 1, further comprising a plurality of second multipliers coupled between the plurality of FFT units and the plurality of first multipliers for multiplying each of the incoming signals output from the FFT units by a reception (RX) calibration weight 1/R when a transfer function characteristic of the signal receiving apparatus is given as R, R is greater than 0.

3. The signal receiving apparatus as claimed in claim 1, wherein the calibration signal generator generates the FFT window calibration signal according to an equation, $$Rx\_Wo\_foi(k)=Rx\_foi(k)*\exp(j*2*pi*k*Wo/N),$$

wherein k=−N/2, −N/2+1, . . . , N/2−1, k denotes a sub-carrier index, N denotes the number of FFT points, Wo denotes the FFT window offset, Rx_foi denotes a frequency offset index of the incoming signals processed by the FFT, exp(j*2*pi*k*Wo/N) denotes the FFT window calibration signal, and Rx_Wo_foi denotes a frequency offset index of the incoming signals compensated by the FFT window offset calibration signal.

4. The signal receiving apparatus as claimed in claim 1, further comprising a reception (RX) beam forming weight calculator for calculating an RX beam forming weight for each of antenna paths by using the incoming signals output from the first multipliers and a predetermined reference signal for estimation of a frequency domain equalizer (FEQ) coefficient.

5. The signal receiving apparatus as claimed in claim 4, wherein the reference signal comprises a long preamble signal defined in a wireless Local Area Network (LAN) standard.

6. The signal receiving apparatus as claimed in claim 5, further comprising a plurality of second multipliers for multiplying the RX beam forming weight, for each of the antenna paths, output from the RX beam forming weight calculator by the incoming signals output from the first multipliers, respectively.

7. The signal receiving apparatus as claimed in claim 6, wherein the RX beam forming weight is calculated by $$\begin{bmatrix} a_{11}e^{jw_o2\pi/N} & a_{12}e^{jw_o2\pi/N} & \cdots & a_{1M}e^{jw_o2\pi/N} \\ a_{21}e^{jw_o2\pi2/N} & a_{22}e^{jw_o2\pi2/N} & \cdots & a_{2M}e^{jw_o2\pi2/N} \\ \cdots & \cdots & \cdots & \cdots \\ a_{N1}e^{jw_o2\pi N/N} & a_{N2}e^{jw_o2\pi N/N} & \cdots & a_{NM}e^{jw_o2\pi N/N} \end{bmatrix} \begin{bmatrix} w_{rx1} \\ w_{rx2} \\ \cdots \\ w_{rxM} \end{bmatrix} = \begin{bmatrix} p_1 \\ p_2 \\ \cdots \\ p_N \end{bmatrix},$$

simplified to $AW_{rx}=P$,
wherein A denotes an N×M matrix which is an observation matrix observed from the incoming signals corresponding to the reference signal, $W_{rx}$ denotes an M column vector corresponding to an RX beam forming weight to be obtained, and P denotes an N column vector corresponding to the reference signal, and, in the N column vector P, the item $e^{jw_o2\pi n/N}$ or $e^{-jw_o2\pi n/N}$, n=1, 2, . . . , N corresponds to a compensation item for the window offset $w_o$.

8. A signal receiving apparatus of a base station in a smart antenna system which uses an Orthogonal Frequency Division Multiplexing (OFDM) communication scheme, the signal receiving apparatus comprising:
a plurality of Fast Fourier Transform (FFT) units for performing FFT according to an FFT window on a plurality of incoming signals received through a plurality of antennas;
an FFT window detector coupled to receive the plurality of incoming signals and a predetermined FFT window offset for detecting a boundary of an OFDM symbol and setting the FFT window with a margin as large as the predetermined FFT window offset with reference to the detected OFDM symbol boundary;
a calibration signal generator for outputting an FFT window calibration signal based on the FFT window offset;
a multiplier for multiplying a predetermined reference signal for frequency domain equalizer (FEQ) coefficient estimation by the FFT window calibration signal; and
a reception (RX) beam forming weight calculator coupled to the plurality of FFT units and the multiplier for calculating an RX beam forming weight for each of the antenna paths by using the incoming signals output from the FFT units and a signal output from the multiplier.

9. The signal receiving apparatus as claimed in claim 8, further comprising a plurality of multipliers for multiplying each of the incoming signals output from the FFT units by an RX calibration weight 1/R when a transfer function characteristic of the signal receiving apparatus is given as R, R is greater than 0.

10. The signal receiving apparatus as claimed in claim 8, wherein the calibration signal generator generates the FFT window calibration signal according to an equation, $$Rx\_Wo\_foi(k)=Rx\_foi(k)*\exp(j*2*pi*k*Wo/N),$$

wherein k=−N/2, −N/2+1, N/2−1, k denotes a sub-carrier index, N denotes the number of FFT points, Wo denotes the FFT window offset, Rx_foi denotes a frequency offset index of the incoming signals processed_by the FFT, exp(j*2*pi*k*Wo/N) denotes the FFT window calibration signal, and Rx_Wo_foi denotes a frequency offset index of the incoming signals compensated by the FFT window offset calibration signal.

11. The signal receiving apparatus as claimed in claim 8, wherein the reference signal comprises a long preamble signal defined in a wireless Local Area Network (LAN) standard.

12. The signal receiving apparatus as claimed in claim 11, further comprising a plurality of multipliers for multiplying the RX beam forming weights for antenna paths output from the RX beam forming weight calculator by the incoming signals output from the FFT units, respectively.

13. The signal receiving apparatus as claimed in claim 12, wherein the RX beam forming weight is calculated by $$\begin{bmatrix} a_{11} & a_{12} & \cdots & a_{1M} \\ a_{21} & a_{22} & \cdots & a_{2M} \\ \cdots & \cdots & \cdots & \cdots \\ a_{N1} & a_{N2} & \cdots & a_{NM} \end{bmatrix} \begin{bmatrix} w_{rx1} \\ w_{rx2} \\ \cdots \\ w_{rxM} \end{bmatrix} = \begin{bmatrix} p_1 e^{-jw_o2\pi/N} \\ p_2 e^{-jw_o2\pi2/N} \\ \cdots \\ p_N e^{-jw_o2\pi N/N} \end{bmatrix},$$

simplified to $AW_{rx}=P$,
wherein A denotes an N×M matrix which is an observation matrix observed from the incoming signals corresponding to the reference signal, $W_{rx}$ denotes an M column vector corresponding to an RX beam forming weight to be obtained, and P denotes an N column vector corresponding to the reference signal, and, in the N column vector P, the item $e^{jw_o2\pi n/N}$ or $e^{-jw_o2\pi n/N}$, n=1, 2, . . . , N corresponds to a compensation item for the window offset $w_o$.

14. A signal receiving apparatus of a mobile terminal in a smart antenna system which uses an Orthogonal Frequency Division Multiplexing (OFDM) communication scheme, the signal receiving apparatus comprising:
a Fast Fourier Transform (FFT) unit for performing FFT according to an FFT window on an incoming signal received through an antenna;
an FFT window detector coupled to receive the incoming signal and a predetermined FFT window offset for detecting a boundary of an OFDM symbol and setting the FFT window with a margin as large as the predetermined FFT window offset with reference to the detected OFDM symbol boundary;
a calibration signal generator for outputting an FFT window calibration signal based on the FFT window offset;
a first multiplier for multiplying the incoming signal output from the FFT unit by the FFT window calibration signal; and
a frequency domain equalizer (FEQ) estimator for estimating FEQ coefficients by using a signal output from the first multiplier and a predetermined reference signal.

15. The signal receiving apparatus as claimed in claim 14, wherein a transmitter of the mobile terminal comprises a second multiplier for multiplying an input outgoing signal by the FEQ coefficients as weights.

16. A signal receiving apparatus of a mobile terminal in a smart antenna system which uses an Orthogonal Frequency Division Multiplexing (OFDM) communication scheme, the signal receiving apparatus comprising:
a Fast Fourier Transform (FFT) unit for performing FFT according to an FFT window on incoming signal received through an antenna;
an FFT window detector coupled to receive the incoming signal and a predetermined FFT window offset for detecting a boundary of an OFDM symbol and setting the FFT window with a margin as large as the predetermined FFT window offset with reference to the detected OFDM symbol boundary;
a calibration signal generator for outputting an FFT window calibration signal based on the FFT window offset;
a first multiplier for multiplying a predetermined reference signal for frequency domain equalizer (FEQ) coefficient estimation by the FFT window calibration signal; and
a FEQ estimator for estimating FEQ coefficients by using a signal output from the FFT unit and a compensated reference signal transferred from the first multiplier.

17. The signal receiving apparatus as claimed in claim 16, wherein a transmitter of the mobile terminal comprises a second multiplier for multiplying an input outgoing signal by the FEQ coefficients as weights.

18. A signal receiving method of a base station in a smart antenna system which uses an Orthogonal Frequency Division Multiplexing (OFDM) communication scheme, the signal receiving method comprising the steps of:
(a) performing Fast Fourier Transform (FFT) according to an FFT window on a plurality of incoming signals received through a plurality of antennas;
(b) detecting a boundary of an OFDM symbol and setting the FFT window with a margin as large as a predetermined FFT window offset with reference to the detected OFDM symbol boundary;
(c) generating an FFT window calibration signal based on the FFT window offset; and
(d) multiplying each of the FFT-processed incoming signals by the FFT window calibration signal.

19. The signal receiving method as claimed in claim 18, further comprising the step of multiplying each of the FFT-processed incoming signals by an reception (RX) calibration weight 1/R when a transfer function characteristic of the signal receiving method is given as R, R is greater than 0.

20. The signal receiving method as claimed in claim 18, wherein the FFT window calibration signal is generated based on an equation, $$Rx\_Wo\_foi(k) = Rx\_foi(k) * \exp(j*2*pi*k*Wo/N),$$

wherein $k = -N/2, -N/2+1, \ldots, N/2-1$, k denotes a subcarrier index, N denotes the number of FFT points, Wo denotes the FFT window offset, Rx_foi denotes a frequency offset index of the incoming signals processed by the FFT, $\exp(j*2*pi*k*Wo/N)$ denotes the FFT window calibration signal, and Rx_Wo_foi denotes a frequency offset index of the incoming signals compensated by the FFT window offset calibration signal.

21. The signal receiving method as claimed in claim 18, further comprising the step of calculating a reception (RX) beam forming weight for each of antenna paths by using the calibrated incoming signals generated by the step (d) and a predetermined reference signal for estimation of a frequency domain equalizer (FEQ) coefficient.

22. The signal receiving method as claimed in claim 21, wherein the reference signal comprises a long preamble signal defined in a wireless Local Area Network (LAN) standard.

23. The signal receiving method as claimed in claim 22, further comprising the step of multiplying the RX beam forming weights for each of the antenna paths by the calibrated incoming signals generated by the step (d), respectively.

24. The signal receiving method as claimed in claim 23, wherein the RX beam forming weight is calculated by $$\begin{bmatrix} a_{11}e^{jw_o 2\pi/N} & a_{12}e^{jw_o 2\pi/N} & \cdots & a_{1M}e^{jw_o 2\pi/N} \\ a_{21}e^{jw_o 2\pi 2/N} & a_{22}e^{jw_o 2\pi 2/N} & \cdots & a_{2M}e^{jw_o 2\pi 2/N} \\ \cdots & \cdots & \cdots & \cdots \\ a_{N1}e^{jw_o 2\pi N/N} & a_{N2}e^{jw_o 2\pi N/N} & \cdots & a_{NM}e^{jw_o 2\pi N/N} \end{bmatrix} \begin{bmatrix} w_{rx1} \\ w_{rx2} \\ \cdots \\ w_{rxM} \end{bmatrix} = \begin{bmatrix} p_1 \\ p_2 \\ \cdots \\ p_N \end{bmatrix},$$

simplified to $AW_{rx} = P$,
wherein A denotes an N×M matrix which is an observation matrix observed from the incoming signals corresponding to the reference signal, $W_{rx}$ denotes an M column vector corresponding to an RX beam forming weight to be obtained, and P denotes an N column vector corresponding to the reference signal, and, in the N column vector P, the item $e^{jw_o 2\pi n/N}$ or $e^{-jw_o 2\pi n/N}$, $n=1, 2, \ldots, N$ corresponds to a compensation item for the window offset $w_o$.

25. A signal receiving method of a base station in a smart antenna system which uses an Orthogonal Frequency Division Multiplexing (OFDM) communication scheme, the signal receiving method comprising:
(a) performing Fast Fourier Transform (FFT) according to an FFT window on a plurality of incoming signals received through a plurality of antennas;
(b) detecting a boundary of an OFDM symbol and setting the FFT window with a margin as large as a predetermined FFT window offset with reference to the detected OFDM symbol boundary;
(c) generating an FFT window calibration signal based on the FFT window offset;
(d) multiplying a predetermined reference signal for frequency domain equalizer (FEQ) coefficient estimation by the FFT window calibration signal; and
(e) calculating a reception (RX) beam forming weight for each of the antenna paths by using the FFT-processed incoming signals and a signal generated by the multiplying step.

26. The signal receiving method as claimed in claim 25, further comprising the step of multiplying each of the FFT-processed incoming signals by an RX calibration weight 1/R when a transfer function characteristic of the signal receiving method is given as R, R is greater than 0.

27. The signal receiving method as claimed in claim 25, wherein the FFT window calibration signal is generated according to an equation, $$Rx\_Wo\_foi(k)=Rx\_foi(k)*\exp(j*2*pi*k*Wo/N),$$

wherein k=−N/2, −N/2+1, N/2−1, k denotes a sub-carrier index, N denotes the number of FFT points, Wo denotes the FFT window offset, Rx_foi denotes a frequency offset index of the incoming signals processed by the FFT, exp(j*2*pi*k*Wo/N) denotes the FFT window calibration signal, and Rx_Wo_foi denotes a frequency offset index of the incoming signals compensated by the FFT window offset calibration signal.

28. The signal receiving method as claimed in claim 25, wherein the reference signal is a long preamble signal defined in a wireless Local Area Network (LAN) standard.

29. The signal receiving method as claimed in claim 28, further comprising the step of multiplying the RX beam forming weights for antenna paths by the FFT-processed incoming signals, respectively.

30. The signal receiving method as claimed in claim 29, wherein the RX beam forming weight is calculated by $$\begin{bmatrix} a_{11} & a_{12} & \cdots & a_{1M} \\ a_{21} & a_{22} & \cdots & a_{2M} \\ \cdots & \cdots & \cdots & \cdots \\ a_{N1} & a_{N2} & \cdots & a_{NM} \end{bmatrix} \begin{bmatrix} w_{rx1} \\ w_{rx2} \\ \cdots \\ w_{rxM} \end{bmatrix} = \begin{bmatrix} p_1 e^{-jw_o 2\pi/N} \\ p_2 e^{-jw_o 2\pi 2/N} \\ \cdots \\ p_N e^{-jw_o 2\pi N/N} \end{bmatrix},$$

simplified to $AW_{rx}=P$, wherein A denotes an N×M matrix which is an observation matrix observed from the incoming signals corresponding to the reference signal, $W_{rx}$ denotes an M column vector corresponding to an RX beam forming weight to be obtained, and P denotes an N column vector corresponding to the reference signal, and, in the N column vector P, the item $e^{jw_o 2\pi n/N}$ or $e^{-jw_o 2\pi n/N}$, n=1, 2, ..., N corresponds to a compensation item for the window offset $w_o$.

31. A signal transmission/reception method of a mobile terminal in a smart antenna system which uses an Orthogonal Frequency Division Multiplexing (OFDM) communication scheme, the mobile terminal comprising a transmitter and a receiver, wherein the signal transmission/reception method comprises the steps of:
(a) performing, by the receiver, Fast Fourier Transform (FFT) on an incoming signal received through an antenna according to an FFT window;
(b) detecting, by the receiver, a boundary of an OFDM symbol and setting the FFT window with a margin as large as a predetermined FFT window offset with reference to the detected OFDM symbol boundary;
(c) generating, by the receiver, an FFT window calibration signal based on the FFT window offset;
(d) multiplying, by the receiver, the FFT-processed incoming signal by the FFT window calibration signal;
(e) estimating, by the receiver, frequency domain equalizer (FEQ) coefficients by using signal generated by the step (d) and a predetermined reference signal; and
(f) multiplying, by the transmitter, an input outgoing signal by the FEQ coefficients as weights.

32. A signal transmission/reception method of a mobile terminal in a smart antenna system which uses an Orthogonal Frequency Division Multiplexing (OFDM) communication scheme, the mobile terminal comprising a transmitter and a receiver, wherein the signal transmission method/reception comprises the steps of:
(a) performing, by the receiver, Fast Fourier Transform (FFT) according to a FFT window on incoming signal received through an antenna;
(b) detecting, by the receiver, a boundary of an OFDM symbol and setting the FFT window with a margin as large as a predetermined FFT window offset with reference to the detected OFDM symbol boundary;
(c) receiving the FFT window offset and generating an FFT window calibration signal based on the FFT window offset;
(d) multiplying, by the receiver, a predetermined reference signal for frequency domain equalizer (FEQ) coefficient estimation by the FFT window calibration signal;
(e) estimating, by the receiver, frequency domain equalizer (FEQ) coefficients by using the FFT-processed incoming signal and a compensated reference signal produced in step (d); and
(f) multiplying, by the transmitter, an input outgoing signal by the FEQ coefficients as weights.

* * * * *